United States Patent
Enomoto

(10) Patent No.: US 8,493,576 B2
(45) Date of Patent: Jul. 23, 2013

(54) MULTIFUNCTIONAL DEVICE WITH AUTOMATIC SWITCHING MODE

(75) Inventor: Katsunori Enomoto, Toyokawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1106 days.

(21) Appl. No.: 11/723,038

(22) Filed: Mar. 16, 2007

(65) Prior Publication Data

US 2007/0216968 A1    Sep. 20, 2007

(30) Foreign Application Priority Data

Mar. 17, 2006    (JP) ................. 2006-074839

(51) Int. Cl.
*G06F 3/12*    (2006.01)

(52) U.S. Cl.
USPC .......... 358/1.13; 358/1.9; 358/1.15; 358/474; 358/498

(58) Field of Classification Search
None
See application file for complete search history.

(56) References Cited

U.S. PATENT DOCUMENTS

| | | | |
|---|---|---|---|
| 4,567,322 A | 1/1986 | Tsuda | |
| 4,897,735 A | 1/1990 | Oneda | |
| 5,339,134 A * | 8/1994 | Nakamura et al. | 399/367 |
| 5,396,341 A * | 3/1995 | Takahashi et al. | 358/400 |
| 5,552,858 A * | 9/1996 | Ujiie et al. | 399/80 |
| 5,663,811 A * | 9/1997 | Shimizu | 358/473 |
| 5,910,848 A * | 6/1999 | Ono | 358/404 |
| 5,929,435 A * | 7/1999 | Han | 250/234 |
| 5,953,553 A | 9/1999 | Eto et al. | |
| 5,969,826 A * | 10/1999 | Dash et al. | 358/400 |
| 6,194,712 B1 * | 2/2001 | Suemoto et al. | 250/234 |
| 6,297,885 B1 * | 10/2001 | Murakami | 358/1.1 |
| 6,498,658 B1 * | 12/2002 | Sekikawa | 358/1.16 |
| 6,646,755 B1 * | 11/2003 | Iwai et al. | 358/1.14 |
| 6,898,389 B2 * | 5/2005 | Osada | 399/81 |
| 6,947,171 B1 | 9/2005 | Narusawa et al. | |
| 7,095,516 B2 * | 8/2006 | Yamashita et al. | 358/1.14 |
| 7,113,719 B2 | 9/2006 | Kubota | |
| 7,315,713 B2 * | 1/2008 | Parry et al. | 399/182 |
| 7,327,483 B2 | 2/2008 | Morisaki | |
| 7,457,010 B2 * | 11/2008 | Tehrani et al. | 358/487 |
| 7,706,710 B2 * | 4/2010 | Funahashi | 399/80 |

(Continued)

FOREIGN PATENT DOCUMENTS

| | | |
|---|---|---|
| EP | 0563884 A2 | 10/1993 |
| EP | 0854630 A2 | 7/1998 |

(Continued)

OTHER PUBLICATIONS

JP Office Action dtd Nov. 11, 2008, JP Appln. 2006-074839.

(Continued)

*Primary Examiner* — Dung Tran
(74) *Attorney, Agent, or Firm* — Banner & Witcoff, Ltd.

(57) ABSTRACT

The multifunction device includes a first mode device, a second mode device, an operating unit, a detecting unit, and a switching unit. The first mode device provides a reading mode that reads image information with using a first type medium. The second mode device provides a writing mode that writes image information with using a second type medium. The operating unit provides each operating environment corresponding to each mode. The detecting unit detects either the first type medium or the second type medium used. The switching unit automatically switches the operating environment provided by the operating unit based on the type of the medium detected by the detecting unit.

28 Claims, 14 Drawing Sheets

U.S. PATENT DOCUMENTS

| | | | |
|---|---|---|---|
| 7,911,664 B2 * | 3/2011 | Horaguchi et al. | 358/498 |
| 8,174,715 B2 * | 5/2012 | Kato et al. | 358/1.15 |
| 2004/0130732 A1 | 7/2004 | Denpo | |
| 2004/0145786 A1 * | 7/2004 | Mui et al. | 358/498 |
| 2004/0189959 A1 * | 9/2004 | Kito | 355/40 |
| 2005/0052691 A1 | 3/2005 | Itoh | |
| 2005/0168763 A1 * | 8/2005 | Higuchi et al. | 358/1.13 |
| 2005/0243362 A1 * | 11/2005 | Sakuda et al. | 358/1.15 |
| 2006/0026350 A1 * | 2/2006 | Lee et al. | 711/115 |
| 2007/0013562 A1 | 1/2007 | Nagasawa | |
| 2007/0109577 A1 | 5/2007 | Yoshida | |
| 2007/0230985 A1 | 10/2007 | Funahashi | |
| 2007/0285718 A1 | 12/2007 | Aoki | |

FOREIGN PATENT DOCUMENTS

| | | |
|---|---|---|
| JP | 61-111260 A | 5/1986 |
| JP | 62-178649 U | 11/1987 |
| JP | 6-350764 A | 12/1994 |
| JP | 8-152813 A | 6/1996 |
| JP | 10-143024 A | 5/1998 |
| JP | 2001-121758 A | 5/2001 |
| JP | 2002314773 | 10/2002 |
| JP | 2003-298798 A | 10/2003 |
| JP | 2005012288 | 1/2005 |
| JP | 2005086266 | 3/2005 |
| JP | 2005-150940 A | 6/2005 |
| JP | 2005156624 | 6/2005 |
| JP | 2005161556 | 6/2005 |
| JP | 2005258630 | 9/2005 |
| JP | 2007-028179 A | 2/2007 |
| JP | 2007-067561 A | 3/2007 |
| JP | 2007-274149 A | 10/2007 |
| JP | 2007-335988 A | 12/2007 |

OTHER PUBLICATIONS

EP Search Report dtd Jun. 26, 2007, EP Appln. 07251118.1.
JP Office Action dtd Jul. 21, 2009, JP Appln. 2006-074839.
Summons to Attend Oral Proceedings dtd Dec. 12, 2006, EP Appin. 07251118.1-1522.
Minutes of the Oral Proceeding in EP Appin 07251118-1 mailed Mar. 4, 2013.
Decision to Refuse a European Patent Application 07251118-1 mailed Mar. 4, 2013.

* cited by examiner

| OPERATING MODE | PRESENCE/ABSENCE OF DOCUMENT | PRESENCE/ABSENCE OF EXTERNAL MEMORY |
|---|---|---|
| DEFAULT MODE | ABSENT | ABSENT |
| USER-DEFINED MODE | PRESENT | ABSENT |
| DIRECT PRINT MODE | ABSENT | PRESENT |
| SCAN-TO-MEMORY MODE | PRESENT | PRESENT |

MULTIFUNCTIONAL DEVICE WITH AUTOMATIC SWITCHING MODE

CROSS REFERENCE TO RELATED APPLICATIONS

This application claims priority from Japanese Patent Application No. 2006074839 filed Mar. 17, 2006. The entire content of each of these priority applications is incorporated herein by reference.

TECHNICAL FIELD

The disclosure relates to a multifunction device having a plurality of modes including a scanner mode and a copy mode.

BACKGROUND

Conventional multifunction devices have a plurality of types of operating modes, such as a scanner mode for reading out image information recorded on documents, a copy mode (printer mode) fox printing image information on a printing medium such as paper, and a facsimile mode for communicating image information over telephone.

One such multifunction device disclosed in Japanese unexamined Patent Application No. 2005-86266 includes a mode switching button which is pressed by the user to select an operation mode.

However, in conventional multifunction devices, the user needs to operate the device by pressing a mode switching button to select the operation mode that the user expects to execute. Thus, the usability of the multifunction device is decreased.

SUMMARY

An object of the present invention is to provide a multifunction device with improved usability.

BRIEF DESCRIPTION OF THE DRAWINGS

Illustrative aspects in accordance with the invention will be described in detail with reference to the following figures wherein.

DETAILED DESCRIPTION

<General Overview>

Figure 1:
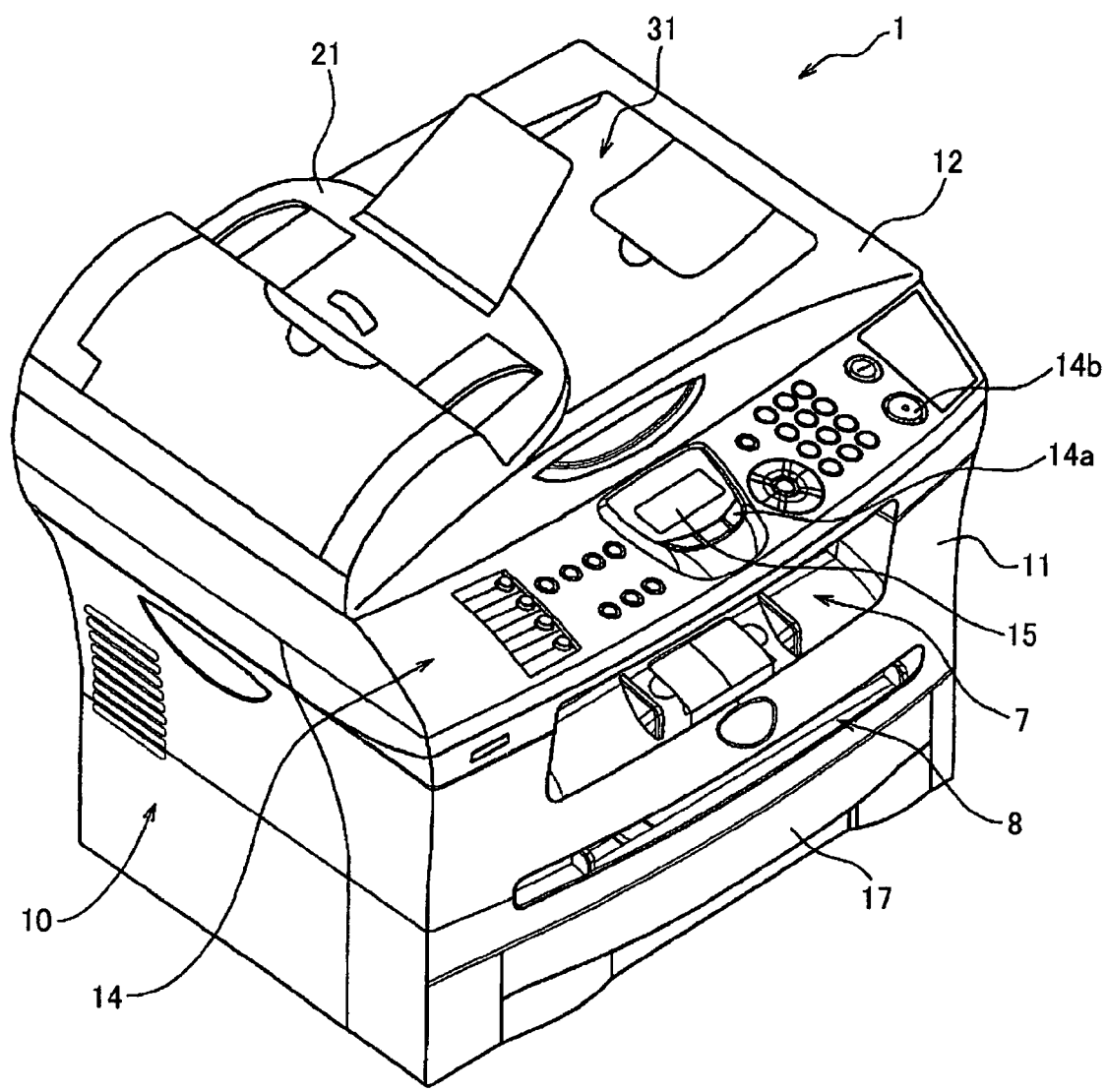
FIG. 1 is a perspective view showing an external structure of a multifunction device.

In order to attain the above and other objects, the invention provides a multifunction device. The multifunction device includes a first mode device, a second mode device, an operating unit, a detecting unit, and a switching unit. The first mode device provides a reading mode that reads image information with using a first type medium. The second mode device provides a writing mode that writes image information with using a second type medium. The operating unit provides each operating environment corresponding to each mode. The detecting unit detects either the first type medium or the second type medium used. The switching unit automatically switches the operating environment provided by the operating unit based on the type of the medium detected by the detecting unit.

According to another aspects, the invention provides a multifunction device. The multifunction device includes a reading mode device, a writing mode device, a printing mode device, a mounting unit, an external storage device, and a controlling unit. The reading mode device is configured to provide a reading mode that reads image information. The writing mode device is configured to provide a writing mode that writes image information. The printing mode device is configured to provide a printing mode that prints image information. The mounting unit detachably mounts an external storage device. The external storage device detecting unit detects whether the external storage device is mounted to the mounting unit. The controlling unit executes at least one of the reading mode, the writing mode, and the printing mode based on a detecting result of the external storage device detecting unit.

According to still another aspects, the invention provides a multifunction device. The multifunction device includes a reading mode device, a writing mode device, a printing mode device, a placing unit, a document detecting unit, and a controlling unit. The reading mode device is configured to provide a reading mode that reads image information. The writing mode device is configured to provide a writing mode that writes image information. The printing mode device is configured to provide a printing mode that prints image information. The placing unit places a document. The document detecting unit detects whether the document placed on the placing unit exists. The controlling unit executes at least one of the reading mode, the writing mode, and the printing mode based on a detecting result of the document detecting unit.

According to still another aspects, the invention provides the multifunction device. The multifunction device has at least two of a reading mode that reads image information with using a first type medium, a writing mode that writes image information with using a second type medium, and a printing mode that prints image information. The multifunction device includes an operating unit, a detecting unit, and a switching unit. The operating unit provides each operating environment corresponding to each mode. The detecting unit detects one of the first type medium, the second type medium and absence of medium. The switching unit automatically switches the operating environment provided by the operating unit based on the type of the medium detected by the detecting unit.

According to still another aspects, the invention provides a multifunction device. The multifunction device has at least two of a reading mode that reads image information, a writing mode that writes image information, and a printing mode that prints image information. The multifunction device includes an external storage device, a controlling unit. The external storage device detecting unit detects whether an external storage device is mounted to a mounting unit. The controlling unit executes at least one of the reading mode, the writing mode, and the printing mode based on a detecting result of the external storage device detecting unit.

According to still another aspects, the invention provides a multifunction device. The multifunction device has at least two of a reading mode that reads image information, a writing mode that writes image information, and a printing mode that prints image information. The multifunction device includes a document detecting unit and a controlling unit. The document detecting unit detects whether a document placed on a placing unit exists. The controlling unit executes at least one of the reading mode, the writing mode, and the printing mode based on a detecting result of the document detecting unit.

A multifunction device according to some aspects of the invention will be described while referring to the accompanying drawings wherein like parts and components are designated by the same reference numerals to avoid duplicating description.

<Illustrative Aspects>

First Embodiment

<Configuration of Entire Device>

FIG. 1 is a perspective view showing an external structure of a multifunction device. The multifunction device 1 includes at least modes of functioning as an image scanner, a printer, a copier, and a facsimile.

Figure 2:
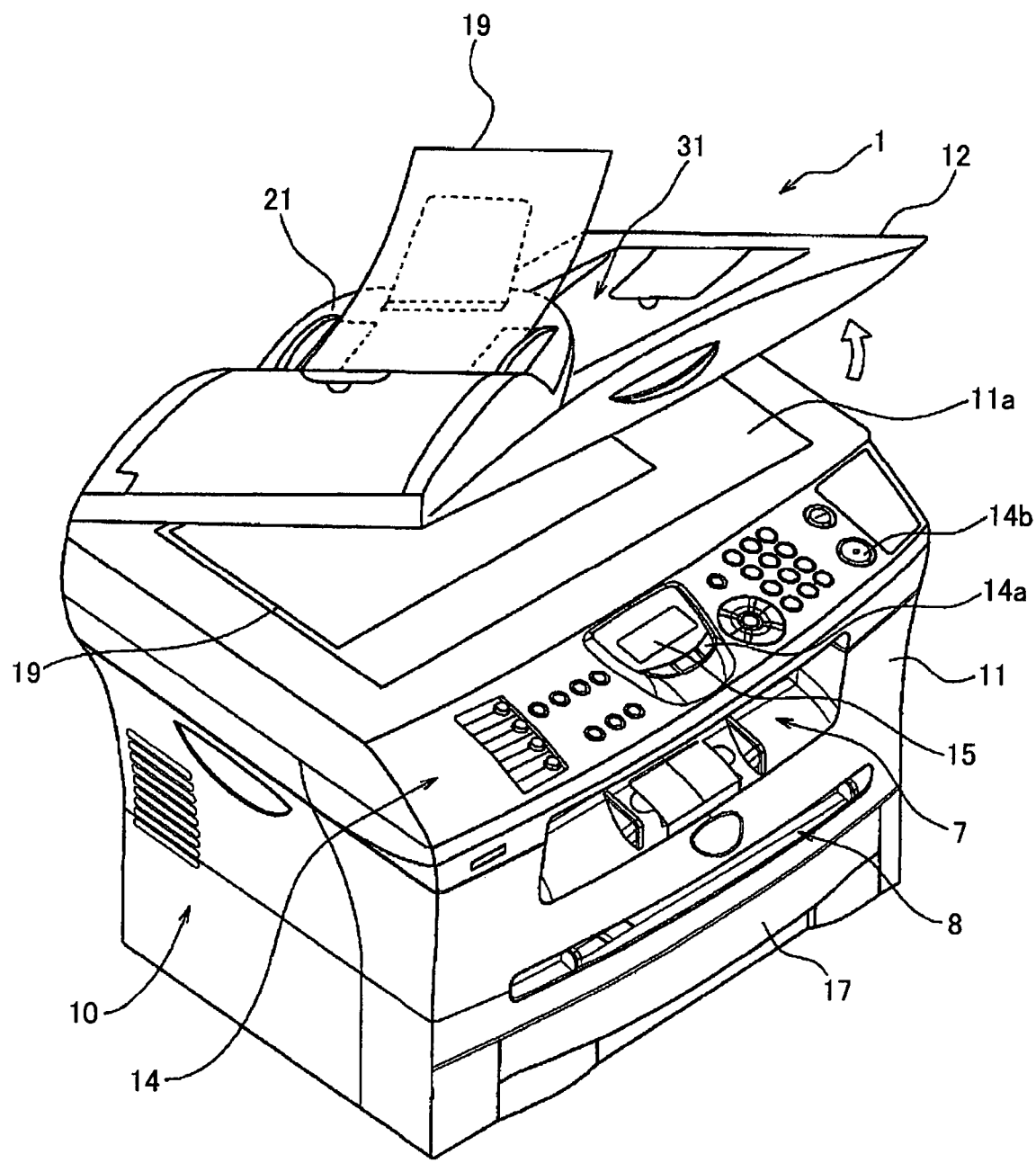
FIG. 2 is a perspective view of the multifunction device when a body cover is open.
Figure 3:
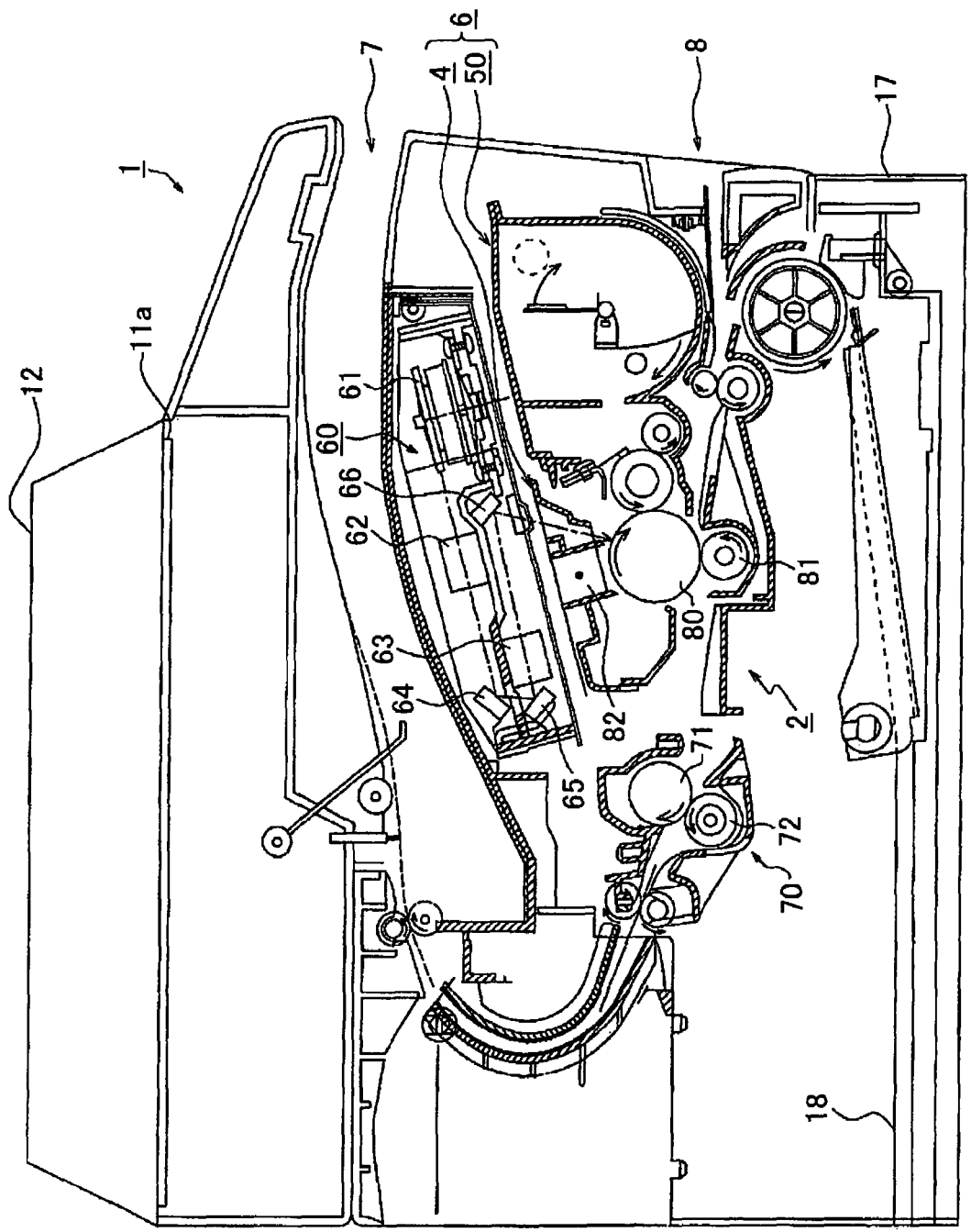
FIG. 3 is a cross-sectional view showing a schematic structure inside the main body of the multifunction device.

As shown in FIGS. 1-3, the multifunction device 1 includes a paper tray 17, a main body 10, and a body cover 12. The paper tray 17 feeds paper 18 for printing (see FIG. 3). The main body 10 creates an image data based on information read from a document 19 (see FIG. 2)) and prints an image on the paper 18 fed from the paper tray 17. The body cover 12 is supported by the main body 10 capable of opening and closing. The body cover 12 covers the whole top surface of the main body 10.

The main body 10 includes a document reading unit 40 (see FIG. 4), an image forming unit 2 (see FIG. 3), and an operating unit 14 (see FIG. 1). The document reading unit 40 reads information on the document 19 (hereinafter described as reading the document 19). The image forming unit 2 forms an image from information read by the document reading unit 40 and prints the image on the paper 18. The operating unit 14 receives information input by the user when the multifunction device 1 is used. The document reading unit 40 and the image forming unit 2 are provided inside a body case 11.

Also, the body case 11 has a reading surface 11a, a manual paper feed unit 8 (FIG. 1), and a paper discharge unit 7. The document 19 is set on the reading surface 11a when information of the document 19 is read by the document reading unit 40. The manual paper feed unit 8 is used for feeding the paper 18 to the image forming unit 2 without using the paper tray 17. The paper discharge unit 7 discharges the paper 18 on which an image is printed by the image forming unit 2.

The reading surface 11a is a board formed by a material such as glass which transmits light, and fixed on the top surface of the body case 11 which faces the body cover 12.

In addition, the operating unit 14 includes an operation selecting key 14a, a start key 14b, and a display unit 15. The operation selecting key 14a is used by a user to select an operating mode that the user wants to execute from a plurality of operating modes. The start key 14b is used for executing the operating mode that the user selected. The display unit 15 is used for displaying the condition of the multifunction device 1.

The operation selecting key 14a is used by the user to select the mode the user wants to use from the modes provided on the multifunction device 1. More specifically, the operation selecting key 14a is provided with a copy key for selecting the copy mode, a facsimile key for selecting the facsimile mode, and a scanner key for selecting the scanner mode.

In addition, the display unit 15 is a liquid crystal panel (so-called touch panel) configured to be capable of inputting a setting (that is, information) required for printing by being pressed by a user.

When a user operates the operation selecting key 14a and selects the operating mode that the user wants to execute, a display is changed and keys are set corresponding to the selected mode. Thus, a switchover of the operating environment provided by the operating unit 14 is ended.

<Configuration of Image Forming Unit>

Next, the image forming unit 2 will be described by using a cross-sectional view of FIG. 3 showing a schematic structure inside the main body 10 of the multifunction device 1.

The image forming unit 2 includes a scanner unit 60, a process cartridge 6, and a fixing unit 70. The scanner unit 60 irradiates laser light to form an image. The process cartridge 6 transfers the image formed by the scanner unit 60 to the paper 18. The fixing unit 70 fixes the image transferred on the paper 18.

The scanner unit 60 includes a laser diode (not illustrated), a polygon mirror 61, and optical units including lenses 62 and 63 and reflection mirrors 64, 65, and 66. The laser diode emits laser light for forming an electrostatic latent image on a photosensitive drum 80 described later. The polygon mirror 61 is rotationally driven to reflect the laser light emitted by the laser diode. The lenses 62 and 63 focus laser light. That is, in the scanner unit 60, the laser light emitted by the laser diode is polarized by the polygon mirror 61, and the polarized laser light is focused and the light path of the laser light is changed by the optical units. Thereafter, the laser light is irradiated to the surface of the photosensitive drum 80 by rapid scanning.

The process cartridge 6 includes a drum cartridge 4 and a development cartridge 50 detachably mounted to the drum cartridge 4. The developer cartridge 50 contains toner (not shown). The process cartridge 6 is formed for carrying out an image forming process (charging, development, transferring).

The drum cartridge 4 includes the photosensitive drum 80, a charger 82, and a transfer roller 81. The photosensitive drum 80 is an irradiated body for laser light. A toner image to be transferred to the paper 18 is formed on the photosensitive drum 80. The charger 82 charges the photosensitive drum 80. The transfer roller 81 transfers the toner image formed on the photosensitive drum 80 to the paper 18. That is, the toner image on the photosensitive drum 80 is transferred to the paper 18 passing between the photosensitive drum 80 and the transfer roller 81.

In addition, the fixing unit 70 includes a heating roller 71 and a pressing roller 72. The toner image is transferred to the paper 18 at a nip position between the photosensitive drum 80 and the transfer roller 81. The fixing unit 70 fixes the toner image on the paper 18 by heating and pressing the toner image when the paper 18 is conveyed between the heating roller 71 and the pressing roller 72.

That is, in the image forming unit 2, the image formed by the laser light irradiated from the scanner unit 60 is transferred to the paper 18 provided from the paper tray 17 when the paper 18 passes the process cartridge 6, and the image is fixed when the paper passes the fixing unit 70.

<Configuration of the Body Cover and the Document Reading Unit>

Figure 4:
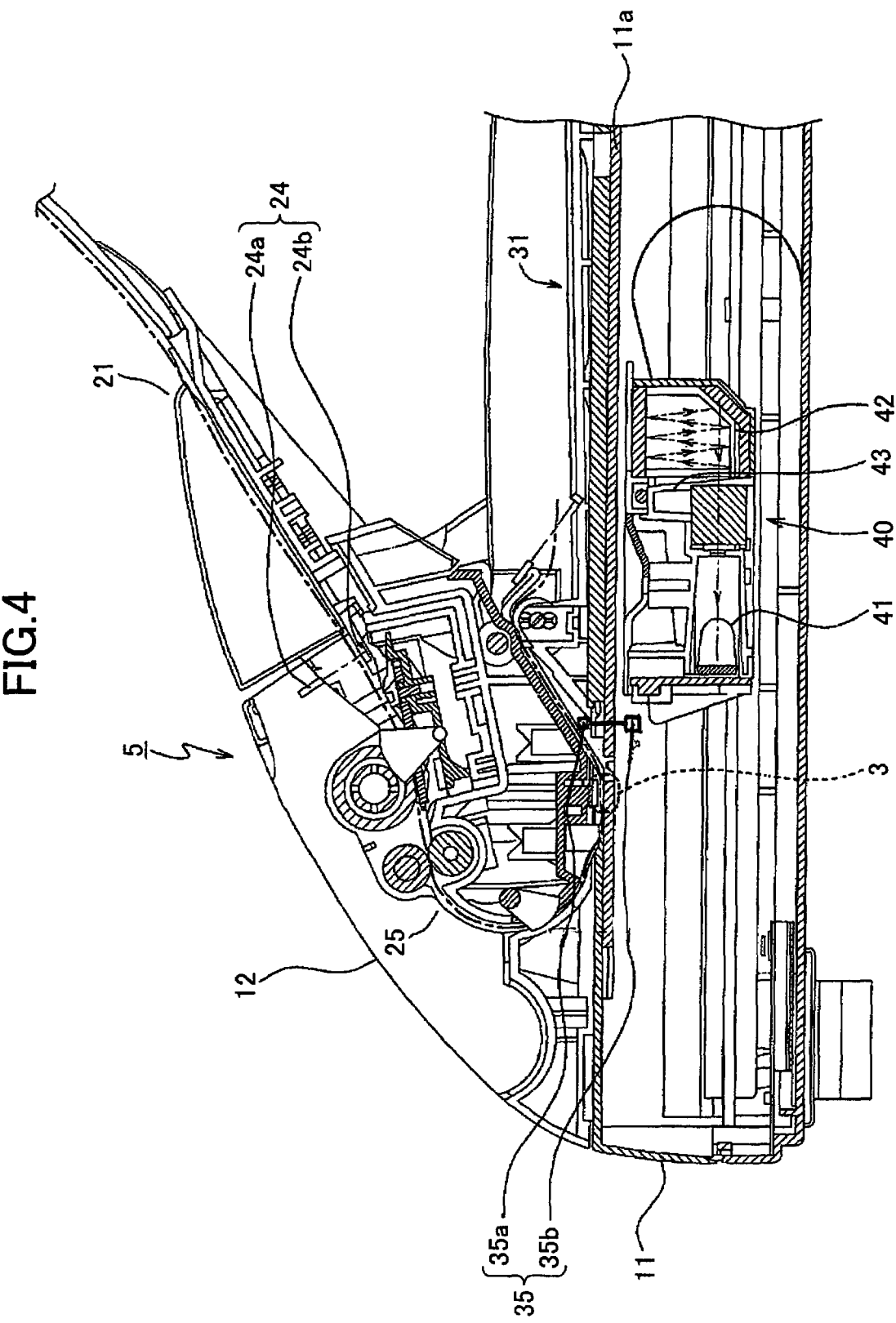
FIG. 4 is a cross-sectional view showing a schematic configuration of the body cover and a document reading unit of the multifunction device.

FIG. 4 is a cross-sectional view showing a schematic configuration of the body cover 12 and the document reading unit 40 of the multifunction device 1. The body cover 12 includes a paper setting portion 21, a paper accumulating portion 31, and a conveying unit 25. The document 19 is set on the paper setting portion 21 before the document is read by the document reading unit 40. The document 19 is accumulated on the paper accumulating portion 31 after the document 19 is read by the document reading unit 40. The conveying unit 25 conveys the document 19 from the paper setting portion 21 to the paper accumulating portion 31 via the reading surface 11a (that is, after the document reading unit 40 held at a document automatic conveying reading position 3 reads the document 19). Hereinafter, the paper setting portion 21, the paper accumulating portion 31, and the conveying unit 25 are collectively called a document automatic conveying device 5.

In addition, as shown in FIG. 4, the document reading unit 40 includes a light source 43, an optical element group 42, and an image sensor 41. The light source 43 irradiates light to the document 19. The optical element group 42 includes mirrors and lenses which focus reflected light reflected by the document 19. The image sensor 41 is used for reading information from the document 19. That is, in the document reading unit 40, the light source 43 irradiates light, the optical element group 42 focus the light reflected by the document 19, and the image sensor 41 detects the reflected and focused light. Thereby, the document reading unit 40 reads the document 19.

Further, the document reading unit 40 can read out the document 19 at the position opposite to the document automatic conveying reading position 3. Moreover, the document reading unit 40 can be moved to the longitudinal direction (left-to-right direction in FIG. 4) of the body case 11 along the reading surface 11a by a document reading unit driving mechanism (not shown).

When the document automatic conveying device 5 is used to read the document 19, the document reading unit 40 is held at the position opposite to the document automatic conveying reading position 3, and all information of the document 19 is read from the document 19 which is conveyed to pass the document automatic conveying reading position 3 by the document automatic conveying device 5.

When the multifunction device 1 is used as a flatbed type device, the document 19 is set on the reading surface 11a to cover the reading surface 11a. The document reading unit 40 is moved by the document reading unit driving mechanism to read all information of the document 19 set on the reading surface 11a.

<Configuration of Document Detecting Sensor>

Next, a document detecting sensor 40 for detecting whether the document 19 read by the document reading unit 40 is placed will be described by using FIG. 4.

The multifunction device 1 includes a document detecting sensor 92. The document detecting sensor 92 (see also FIG. 5) 92 includes a setting unit detecting sensor 24 and a reading surface detecting sensor 35. The setting unit detecting sensor 24 detects that the document 19 is set on the paper setting portion 21. The reading surface detecting sensor 35 detects that the document 19 is placed on the reading surface 11a.

The setting unit detecting sensor 24 and the reading surface detecting sensor 35 are optical sensors including light emitting unit 24a and light receiving unit 24b, and light emitting unit 35a and light receiving unit 35b, respectively. The light emitting unit 24a is located opposite to the light receiving unit 24b such that light emitted from the light emitting units 24a to the light receiving units 24b is blocked by the document 19 set on the paper setting portion 21. The light emitting unit 35a is located opposite to the light receiving unit 35b such that that light emitted from the light emitting units 35a to the light receiving units 35b is blocked by the document 19 set on the reading surface 11a.

The light receiving unit 35b is located at the position apart from the moving path of the document reading unit 40 in the body case 11, and the light emitting unit 35a is placed inside the body cover 12. That is, the reading surface detecting sensor 35 is formed so that the light emitted from the light emitting unit 35a is received by the light receiving unit 35b when the body cover 12 is closed.

Accordingly, when the document 19 does not exist at the installation position of the document detecting sensor 92, the light receiving units 24b and 35b detects the light irradiated from the light emitting units 24a and 35a. In this case, the document detecting sensor 92 obtains a light receiving signal with a large signal level from the light receiving units 24b and 35b. On the other hand, when the document 19 exists at the installation position of the document detecting sensor 92, the light irradiated from the light emitting units 24a and 35a is blocked by the document 19 and the light receiving units 24b and 35b do not detect the light. In this case, the document detecting sensor 92 obtains a light receiving signal with a small signal level from the light receiving units 24b and 35b.

That is, the document detecting sensor 92 is formed such that have a CPU 103 (see FIG. 5) recognize whether the document 19 exists or not based on the difference in the signal level of the light receiving signal which is output from the light receiving units 24b and 35b.

<Explanation Concerning an Electrical Configuration>

Figure 5:
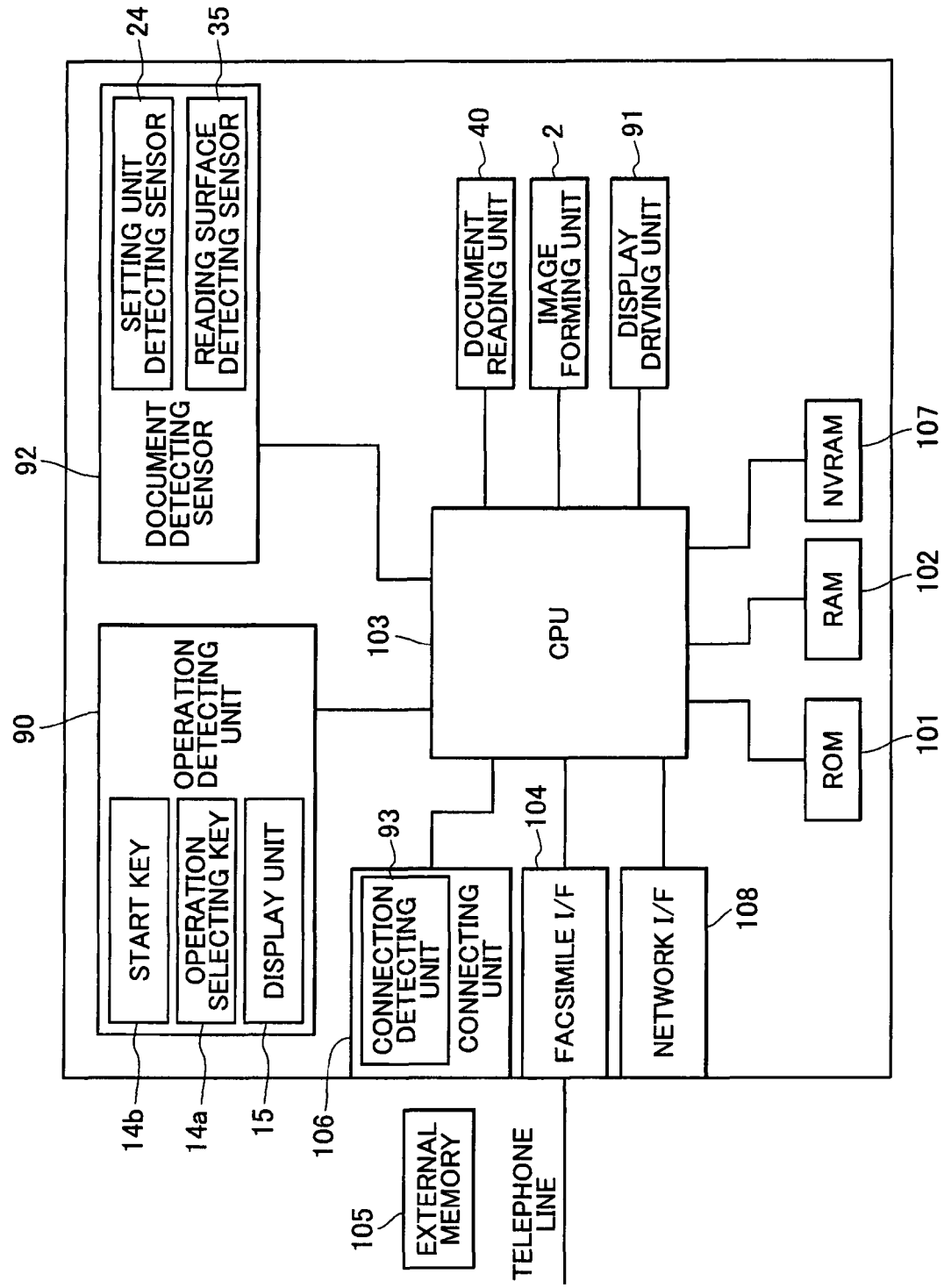
FIG. 5 is a block diagram showing a control system of the multifunction device.

FIG. 5 shows an electrical configuration of the multifunction device 1. The multifunction device 1 includes a network interface (network I/F) 108, a facsimile I/F (facsimile interface) 104, a connecting unit 106, and a ROM 101, a RAM 102, an NVRAM (non-volatile memory) 107, and the CPU 103. The network interface 108 is used for connecting external equipments (not shown) such as a personal computer. The facsimile I/F 104 is used for connecting the multifunction device 1 to a telephone line. The connecting unit 106 is used for installing a removable external memory 105 which can read and write image data. The ROM 101 stores a process program for controlling a variety of drives of the multifunction device 1. The RAM 102 temporarily stores results of processing. The NVRAM 107 stores data which needs to be retained even after the multifunction device 1 is powered off. The CPU 103 executes the process program stored in the ROM 101.

Further, the CPU 103 is connected to the document reading unit 40, the image forming unit 2, a display driving unit 91 which displays images on the display unit 15, an operation detecting unit 90 which detects that the operating unit 14 is operated, and the document detecting sensor 92.

The connecting unit 106 is formed to energize the external memory 105 when the external memory 105 is installed. In addition, the connection unit 106 includes a connection detecting unit 93 for detecting that the external memory 105 is installed. The image data stored in the external memory 105 includes data having a generalized image format such as JPEG and TIFF, data which is created by a generalized word processor, document data in PDF format, and print data output by a print driver which is converted into a file.

<Operating Mode>

Next, an operating mode of the multifunction device 1 will be described.

The multifunction device 1 includes modes to function as an image scanner, a printer, a copier, and a facsimile. The multifunction device 1 is provided, as factory default setting, with a plurality of sets of operations that include at least one of the operating modes.

The operating mode includes a scanner mode, a copy mode, a FAX mode, and a print mode. The scanner mode stores an image read from the document 19 as image data. The copy mode prints the image read from the document 19 on the paper 18 by driving the image forming unit 2. The FAX mode transmits over a telephone line the image read from the document 19. The print mode prints on the paper 18 an image based on the image data stored in the NVRAM 107 of the multifunction device 1.

Further, the operating mode includes a scan-to-memory mode and a direct print mode. The scan-to-memory mode stores the image data read from the document 19 in the external memory 105 connected to the connecting unit 106. The direct print mode reads image data from the external memory 105 connected to the connection unit 106 and prints an image based on the image data on the paper 18.

Further, the operating mode includes a default mode (print mode in the present embodiment) and a user-defined mode). When the multifunction device 1 is powered on without setting the document either on the paper setting portion 21 or the reading surface 11*a*, the CPU 103 selects the default mode from the operation modes and CPU 103 proceeds the default mode. The user defines the user-defined mode such that the user-defined mode includes processes of reading image data from the document 19 such as the scanner mode and the copy mode.

The user sets the user-defined mode by selecting one of the operating modes other than the scan-to-memory mode and the direct print mode through the operation of the operating unit 14. In the present embodiment, the user-defined mode is sets as the copy mode. Further, the user sets the default mode by selecting one of the operating mode.

In the operating modes, a setting screen is displayed on the display unit 15. A user input the settings necessary for executing processes corresponding to each mode on the setting screen.

More specifically, the settings input through the setting screen include the format of image data to be stored in the scanner mode, the number of sheets of paper to be printed in the copy mode, the designation of image data to be printed and the number of prints in the print mode, the transmission destination in the FAX mode, the storage format of image data to be stored and the folder which the image data is stored to in the scan-to-memory mode, and the designation of image data to be read from the image data stored in the external memory and the number of prints in the direct print mode.

The CPU 103 executes a mode switching process. In the mode switching process, the CPU 103 selects one operating mode from the plurality of the operating modes previously set in the multifunction device 1 based on information obtained from the document detecting sensor 92 and the connection detecting unit 93. Then, the CPU 103 executes a mode switching process to switch the operating environment provided by the operating unit 14. Further, when the start key 14*b* is pressed under the switched operating environment corresponding to the selected mode, the CPU 103 executes processes corresponding to the operating mode based on a variety of the settings input through the screen of the display unit 15 which is switched to the operating environment corresponding to the selected mode.

However, the mode selected by pressing the operation selecting key 14*a* is set to have a higher priority than the operating mode previously selected by the mode switching process.

<Mode Switching Process>

Figure 6:
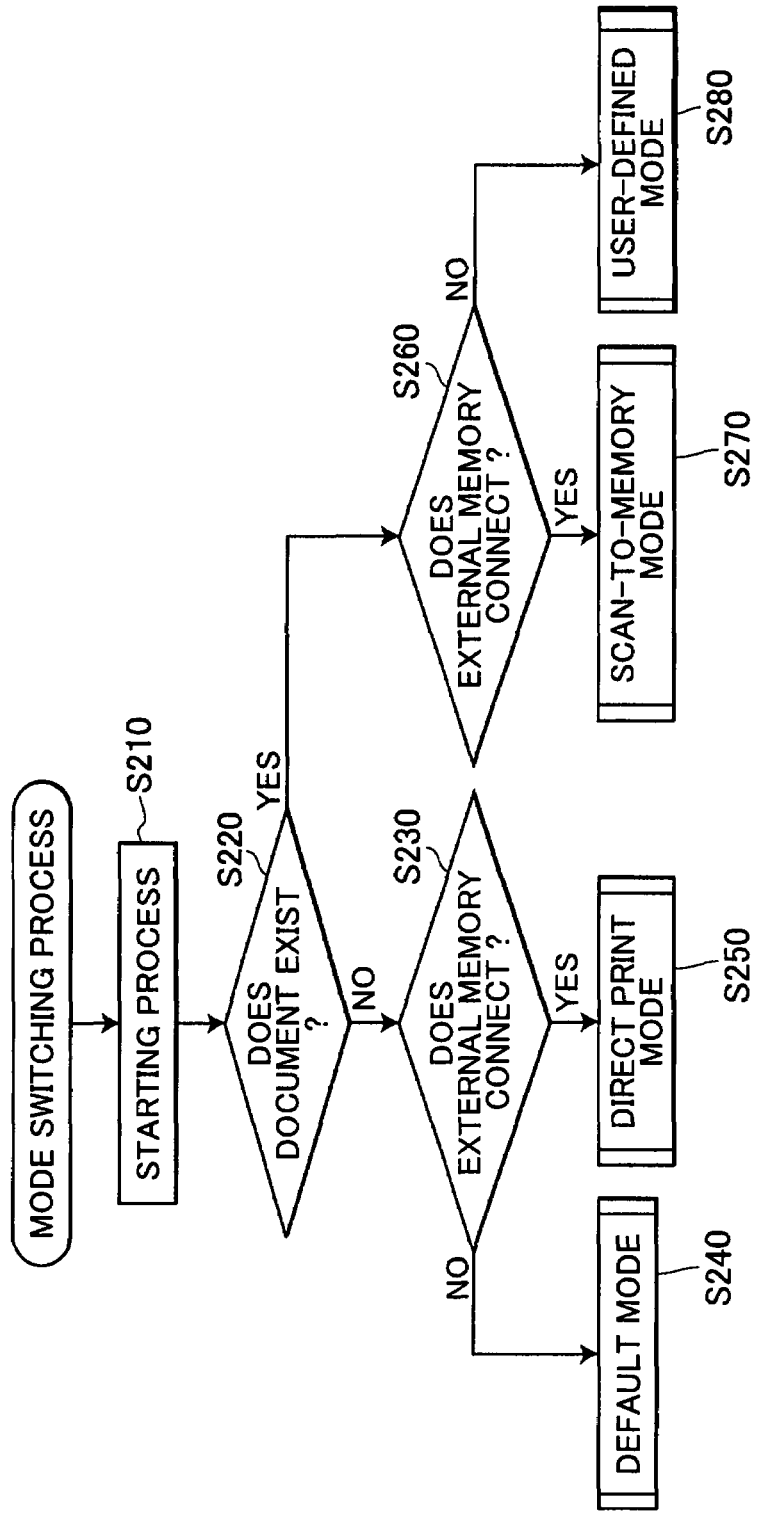
FIG. 6 is a flowchart showing a mode switching process.

Next, the mode switching process executed by the CPU 103 will be described by using a flowchart shown in FIG. 6.

The mode switching process is executed when the multifunction device 1 is powered on (that is, when the multifunction device 1 starts). In S210 of the mode switching process as shown in FIG. 6, a known starting process is executed for preparing operations of the multifunction device 1 so that the image forming unit 2 and the document reading unit 40 of the multifunction device 1 are set in an operable state.

In the following S220, the CPU 103 obtains a light receiving signal from the setting unit detecting sensor 24 and the reading surface detecting sensor 35. Thereby, the CPU 103 determines whether the document 19 is set on at least one of the paper setting portion 21 and the reading surface 11*a*. As a result thereof, if the CPU 103 determines that the document 19 is not set on either the paper setting portion 21 or the reading surface 11*a* (S220: NO), the CPU 103 proceeds to S230.

In S230, the CPU 103 obtains a detecting result of the connection detecting unit 93. Thereby, the CPU 103 determines whether the external memory 105 is connected to the connecting unit 106. As a result thereof, if the CPU 103 determines that the external memory 105 is not connected to the connecting unit 106, the CPU 103 proceeds to S240.

In S240, the CPU 103 switches to the default mode process.

If the CPU 103 determines that the external memory 105 is connected to the connecting unit 106 (S230: YES), the CPU 103 proceeds to S250. In S250, the CPU 103 switches to the direct print mode process.

If the CPU 103 determines that the document 19 is set on at least one of the paper setting portion 21 and the reading surface 11*a* (S220: YES), the CPU 103 proceeds to S260.

In S260, the CPU 103 obtains a detecting result of the connection detecting unit 93 to determine whether the external memory 105 is connected to the connecting unit 106. As a result thereof, if the CPU 103 determines that the external memory 105 is connected to the connecting unit 106 (S260: YES), the CPU 103 proceeds to S270.

In S270, the operating mode is switched to the scan-to-memory mode, and the CPU 103 switches to a scan-to-memory mode process.

If the CPU 103 determines that the external memory 105 is not connected to the connecting unit 106 (S260: NO), the CPU 103 proceeds to S280. In S280, the CPU 103 switches to the user-defined mode process.

<Default Mode Process>

Figure 7:
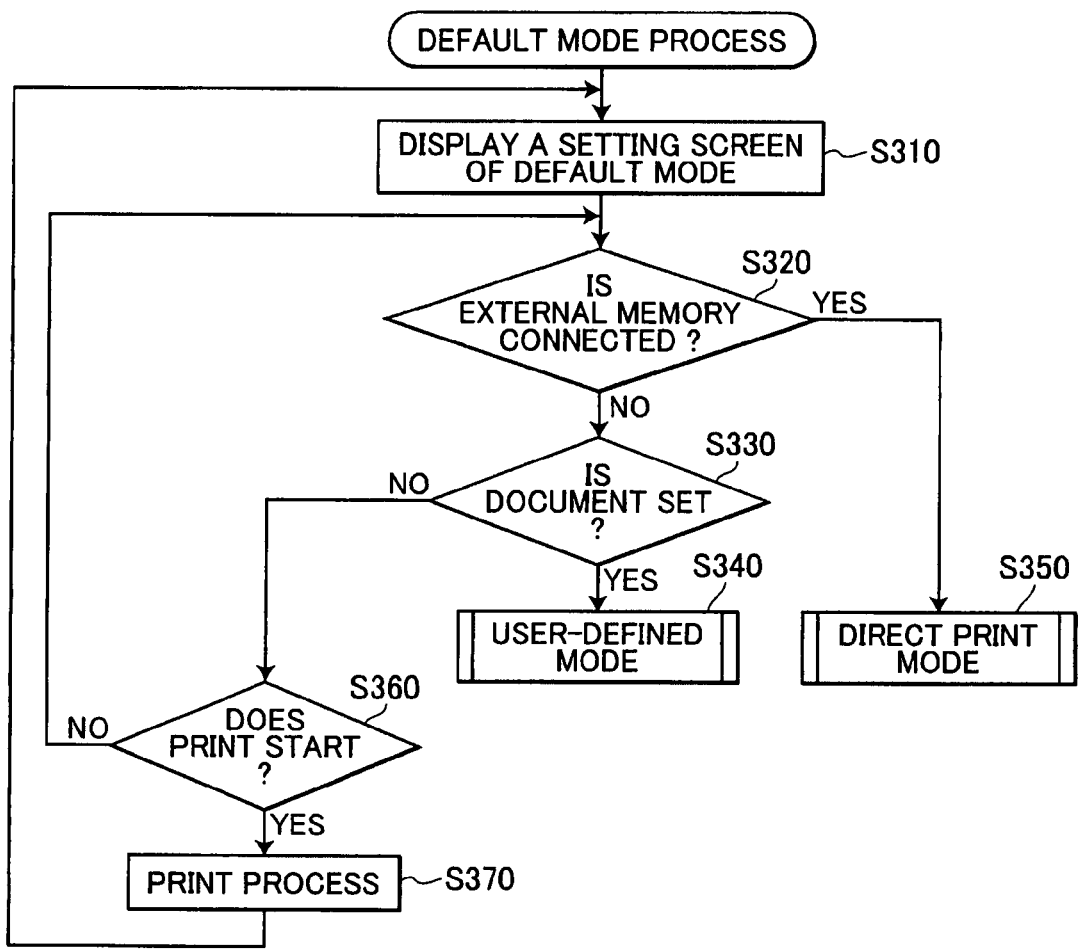
FIG. 7 is a flowchart showing a default mode process executed in the mode switching process.

Next, the default mode process executed by the CPU 103 in S240 of the mode switching process will be described by using a flowchart shown in FIG. 7.

In S310 of the default mode process, the CPU 103 allows the display driving unit 91 to display, on the display unit 15, a setting screen (print setting screen in the present embodiment) which is switched to the operating environment corresponding to the default mode.

In the following S320, the CPU 103 obtains a detecting result of the connection detecting unit 93 to determine whether the external memory 105 is connected to the connecting unit 106. As a result thereof, if the CPU 103 determines that the external memory 105 is connected to the connecting unit 106 (S320: YES), the CPU 103 proceeds to S350.

In S350, the CPU 103 switches to the direct print mode process.

On the other hand, if the CPU 103 determines that the external memory 105 is not connected to the connecting unit 106 (S320: NO), the CPU 103 proceeds to S330.

In S330, the CPU 103 obtains a light receiving signal from the setting unit detecting sensor 24 and the reading surface detecting sensor 35. Thereby, the CPU 103 determines whether the document 19 is set on at least one of the paper setting portion 21 and the reading surface 11a. As a result thereof, if the CPU 103 determines that the document 19 is set on one or both of the paper setting portion 21 and the reading surface 11a, the CPU 103 proceeds to S340.

In S340, the CPU 103 switches to the user-defined mode process.

If the CPU 103 determines that the document 19 is set on either the paper setting portion 21 or the reading surface 11a (S330: NO), the CPU 103 proceeds to S360.

In S360, the CPU 103 determines whether to execute the print mode. As a result thereof, if the CPU 103 determines to execute the print mode, the CPU 103 proceeds to S370. That is, in S360, the CPU 103 determines whether any of the image data stored in the multifunction device 1 is designated and information of the number of prints is input, which are required for executing the print mode, and whether the start key 14b is pressed. If any of the image data stored in the multifunction device 1 is designated, the information of the number of prints is input, and the start key 14b is pressed (S360: YES), the CPU 103 proceeds to S370.

In S370, the print mode is executed, and image data stored in the multifunction device 1 is printed in accordance with the designated image data and the number of prints being input. Then, the CPU 103 returns to S310.

If the CPU 103 determines not to execute the print mode (S360: NO), the CPU 103 returns to S320. That is, if the user of the multifunction device 1 does not execute at least one of the designation of the image data stored in the multifunction device 1, the input of the information of the number of prints, and the pressing of the start key 14b, the CPU 103 returns to S320.

<Direct Print Process>

Figure 8:
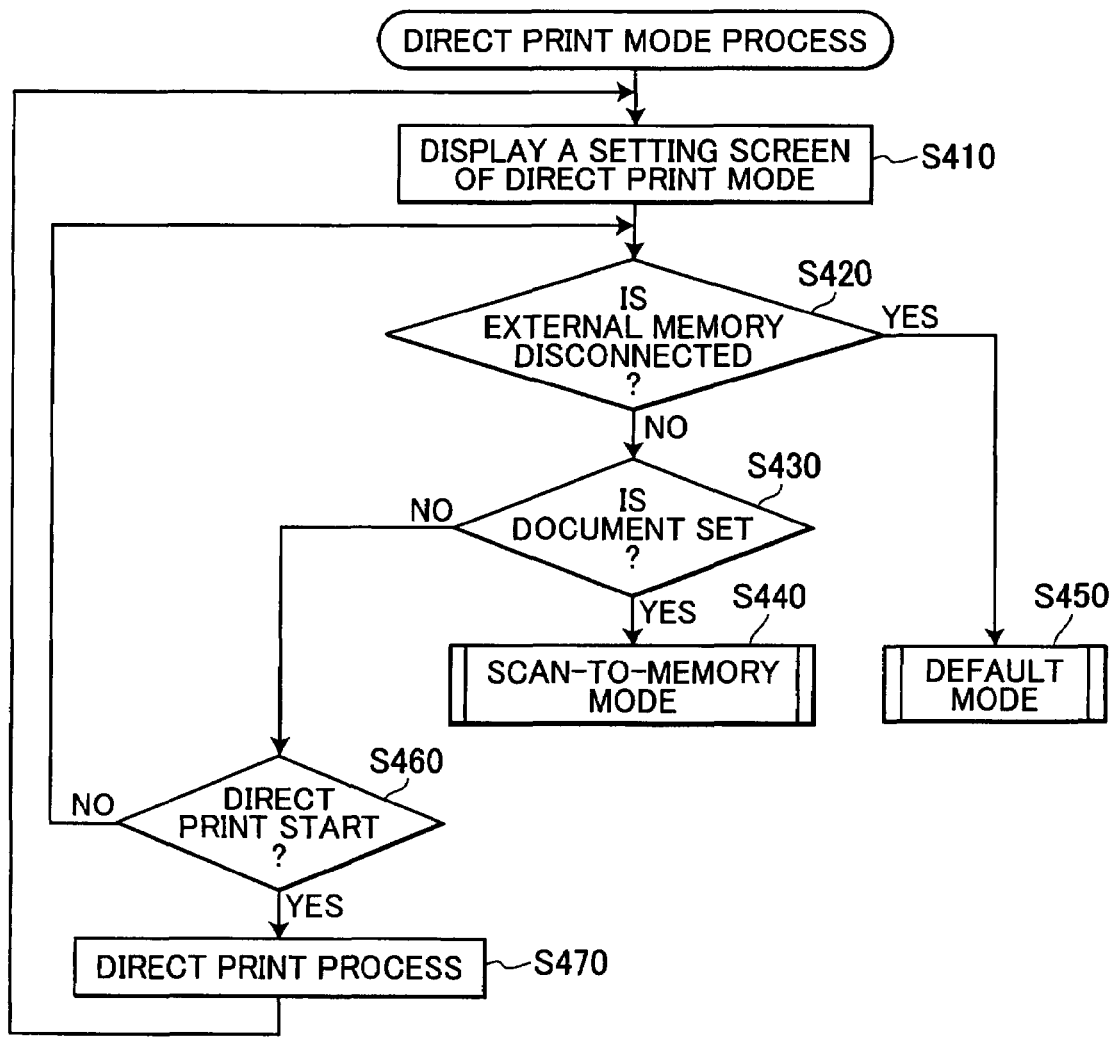
FIG. 8 is a flowchart showing a direct print mode process executed in the mode switching process.

Next, the direct print mode process executed by the CPU 103 in S250 of the mode switching process will be described by using a flowchart shown in FIG. 8.

In S410 of the direct print mode process, the CPU 103 allows the display driving unit 91 to display, on the display unit 15, the setting screen which is switched to the operating environment corresponding to the direct print mode.

In the next S420, the CPU 103 obtains a detecting result of the connection detecting unit 93 to determine whether the external memory 105 is disconnected to the connecting unit 106. As a result thereof, if the CPU 103 determines that the external memory 105 is disconnected to the connecting unit 106 (S420: YES), that is the external memory 105 is not connected to the connecting unit 106, the CPU 103 proceeds to S450. In S450, the operating mode is switched to the default mode.

If the CPU 103 determines that the external memory 105 is not disconnected to the connecting unit 106 (S420: NO), that is, the external memory 105 is connected to the connecting unit 106, the CPU 103 proceeds to S430.

In S430, the CPU 103 obtains a light receiving signal from the setting unit detecting sensor 24 and the reading surface detecting sensor 35. Thereby, the CPU 103 determines whether the document 19 is set on at least one of the paper setting portion 21 and the reading surface 11a. As a result thereof, if the CPU 103 determines that the document 19 is placed on one or both of the paper setting portion 21 and the reading surface 11a (S430: YES), the CPU 103 proceeds to S440.

In S440, the mode is switched to the scan-to-memory mode.

If the CPU 103 determines that the document 19 is not set on either the paper setting portion 21 or the reading surface 11a (S430: NO), the CPU 103 proceeds to S460.

In S460, the CPU 103 determines whether to execute the direct print mode. As a result thereof, if the CPU 103 determines to execute the direct print mode, the CPU 103 proceeds to S470. That is, the CPU 103 determines whether the image data to be read is designated and information of the number of prints is input, which are required for executing the direct print mode, and whether the start key 14b is pressed. As a result of the determination, if the information of the number of prints is input, and the start key 14b is pressed, the CPU 103 proceeds to S470.

In S470, the direct print mode is executed, and the designated image data is read from the external memory 105 and printed for the number of prints being input. Then, the CPU 103 returns to S410.

If the CPU 103 determines not to execute the direct print mode (S460: NO), in S460, the CPU 103 returns to S420. That is, if the user of the multifunction device 1 does not execute at least one of the designation of the image data to be read, the inputting of the information of the number of prints, and the pressing of the start key 14b, the CPU 103 returns to S420.

<Scan-To-Memory Mode Process>

Figure 9:
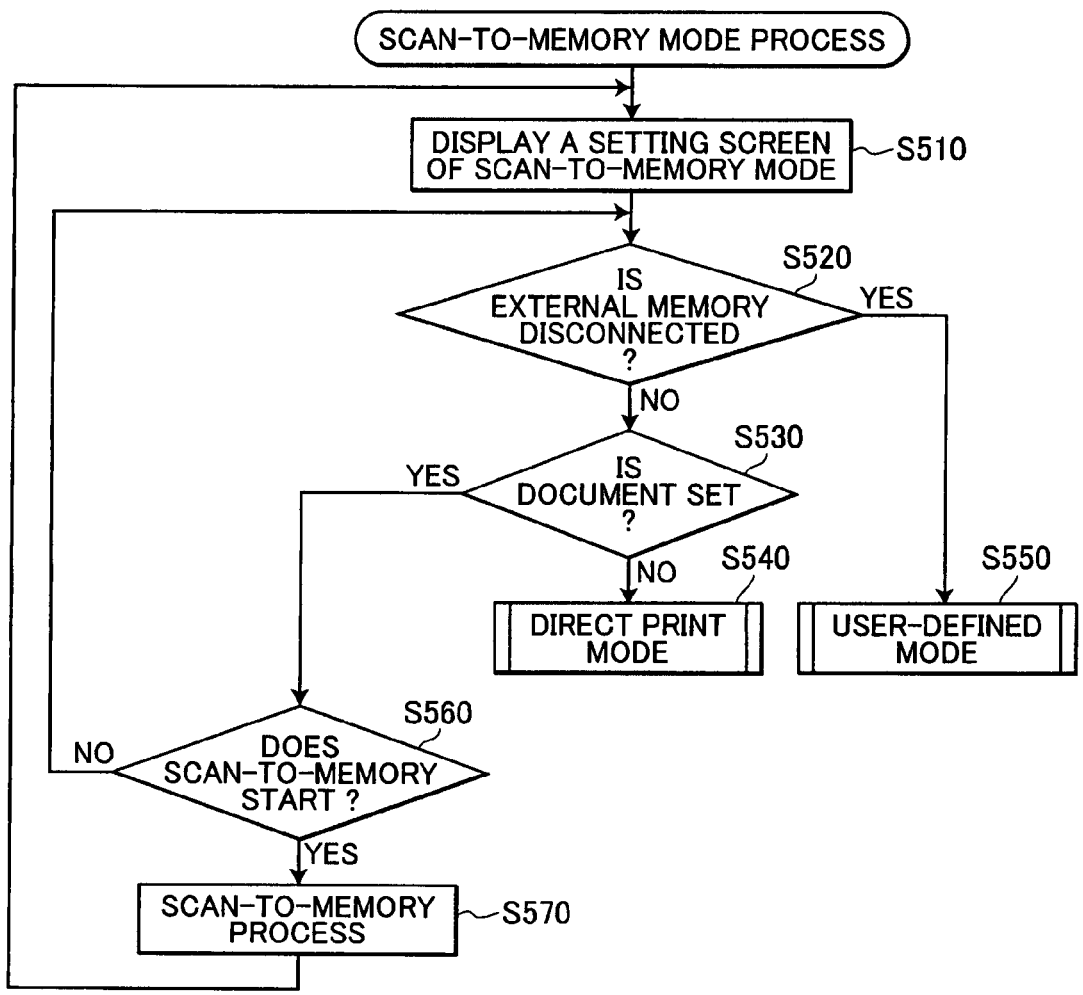
FIG. 9 is a flowchart showing a scan-to-memory mode process executed in the mode switching process.

Next, the scan-to-memory mode process executed by the CPU 103 in S260 of the mode switching process will be described by using a flowchart shown in FIG. 9.

First, in S510 of the scan-to-memory mode process, the CPU 103 allows the display driving unit 91 to display, on the display unit 15, the setting screen which is switched to the operating environment corresponding to the scan-to-memory mode.

Subsequently, the CPU 103 obtains a detecting result of the connection detecting unit 93 in S520 to determine whether the external memory 105 is disconnected to the connecting unit 106. As a result thereof, if the CPU 103 determines that the external memory 105 is disconnected to the connecting unit 106 (S520: YES), the CPU 103 proceeds to S550. In S550, the mode is switched to the user-defined mode.

On the other hand, if the CPU 103 determines that the external memory 105 is connected to the connecting unit 106 (S520: NO), the CPU 103 proceeds to S530.

In S530, the CPU 103 obtains a light receiving signal from the setting unit detecting sensor 24 and the reading surface detecting sensor 35. Thereby, the CPU 103 determines whether the document 19 is set on at least one of the paper setting portion 21 and the reading surface 11a. As a result thereof, if the CPU 103 determines that the document 19 is not set on either the paper setting portion 21 or the reading surface 11*a*, the CPU 103 proceeds to S540.

In S540, the CPU 103 switches to the direct print mode process.

If the CPU 103 determines that the document 19 is set on one or both of the paper setting portion 21 and the reading surface 11*a* (S530: YES), the CPU 103 proceeds to S560.

In S560, the CPU 103 determines whether to execute the scan-to-memory mode. As a result thereof, if the CPU 103 determines to execute the scan-to-memory mode (S560: YES), the CPU 103 proceeds to S570. That is, in S560, the CPU 103 determines whether information including the storage format and the storage destination of the image data which are required for executing the scan-to-memory mode is input, and whether the start key 14*b* is pressed. If the information including the storage destination is input and the start key 14*b* is pressed, the CPU 103 proceeds to S570.

In S570, the scan-to-memory mode is executed. The image data read from the document 19 is stored in the designated area of the external memory 105 as the image data of the storage format being input. Then, the CPU 103 returns to S510.

If the CPU 103 determines not to execute the scan-to-memory mode (S560: NO), the CPU 103 returns to S520. That is, if the user of the multifunction device 1 does not execute at least one of the inputting of the information including the storage format and the storage destination of the image data, and the pressing of the start key 14*b*, the CPU 103 returns to S520.

<User-Defined Mode Process>

Next, the user-defined mode process executed by the CPU 103 in S270 of the mode switching process will be described by using a flowchart shown in FIG. 10.

At first, in S510 of the user-defined mode, the CPU 103 allows the display driving unit 91 to display, on the display unit 15, the setting screen (copy setting screen in the present embodiment) which is switched to the operating environment corresponding to the user-defined mode.

Subsequently, the CPU 103 obtains a detecting result of the connection detecting unit 93 in S620 to determine whether the external memory 105 is connected to the connecting unit 106. As a result thereof, if the CPU 103 determines that the external memory 105 is connected to the connecting unit 106 (S620: YES), the CPU 103 proceeds to S650. In S650, the CPU 103 switches to the scan-to-memory mode process.

On the other hand, if the CPU 103 determines that the external memory 105 is not connected to the connecting unit 106 (S620: NO), the CPU 103 proceeds to S630.

In S630, the CPU 103 obtains a light receiving signal from the setting unit detecting sensor 24 and the reading surface detecting sensor 35. Thereby, the CPU 103 determines whether the document 19 is set on at least one of the paper setting portion 21 and the reading surface 11*a*. As a result thereof, if the CPU 103 determines that the document 19 is not set on either the paper setting portion 21 or the reading surface 11*a* (S630: NO), the CPU 103 proceeds to S640.

In S640, the CPU 103 switches to the default mode process.

If the CPU 103 determines that the document 19 is set on one or both of the paper setting portion 21 and the reading surface 11*a* (S630: YES), the CPU 103 proceeds to S660.

In S660, the CPU 103 determines whether to execute the copy mode. As a result thereof, if the CPU 103 determines to execute the copy mode (S660: YES), the CPU 103 proceeds to S670. That is, in S660, the CPU 103 determines whether information including the number of sheets of paper to be printed is input, which is required for executing the copy mode, and whether the start key 14*b* is pressed. If the information including the number of sheets of paper to be printed is input and the start key 14*b* is pressed, the CPU 103 proceeds to S670.

In S670, the copy mode is executed, and the image read from the document 19 is printed for the number of sheets being input. Then, the CPU 103 returns to S610.

On the other hand, if the CPU 103 determines not to execute the copy mode (S660: NO), the CPU 103 returns to S620. That is, if the user of the multifunction device 1 does not execute at least one of the inputting of the information including the number of sheets of paper to be printed, and the pressing of the start key 14*b*, the CPU 103 returns to S620.

Figures 10, 11:
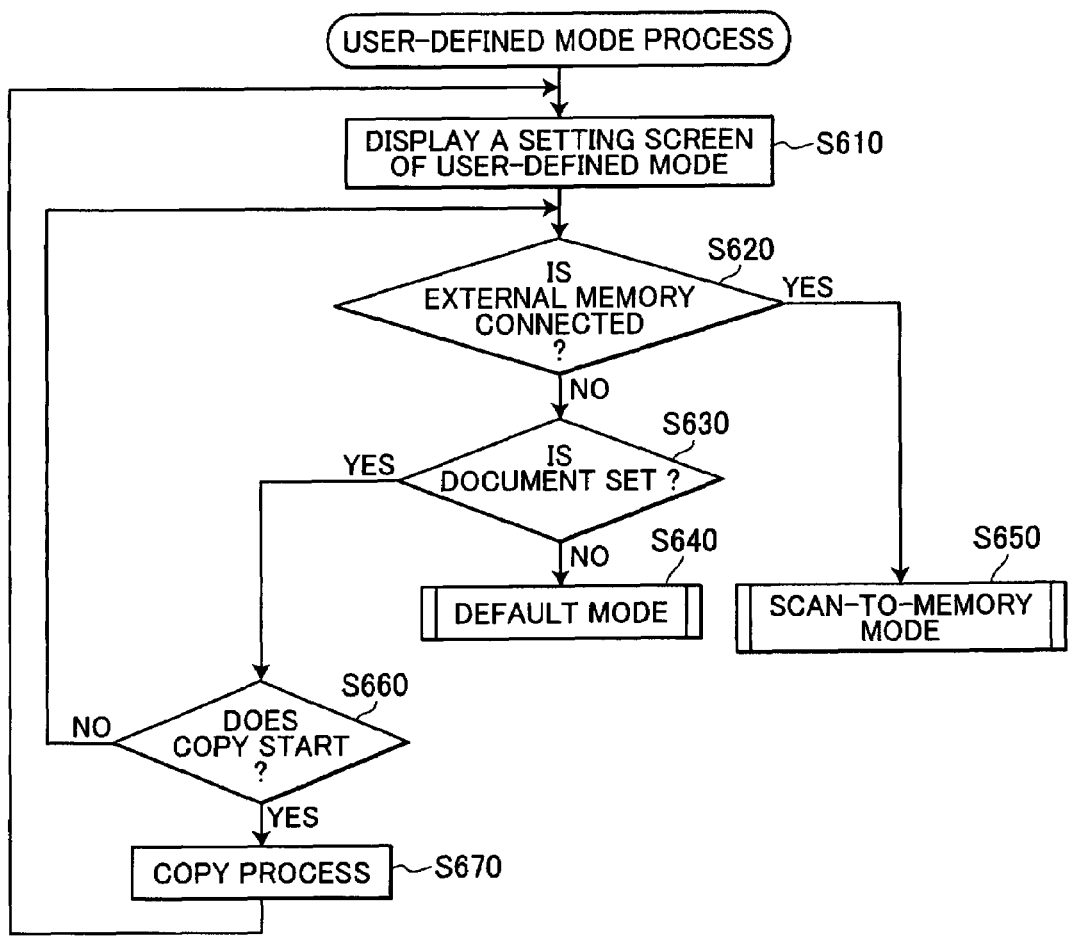
FIG. 10 is a flowchart showing a user-defined mode process executed in the mode switching process.
FIG. 11 is an explanatory view showing a relationship between whether a document is set and whether an external memory is connected, and a mode selected by the mode switching process.

Here, a relationship of the existence of the document and the existence of the external memory with the mode selected by the mode switching process is shown in FIG. 11.

As shown in FIG. 11, when the external memory 105 is connected to the connecting unit 106 and the document 19 is set on the paper setting portion 21 or the reading surface 11*a*, there is a high possibility that both the external memory 105 and the document 19 are used. For this reason, the CPU 103 executes the mode switching process to automatically switch the mode to the scan-to-memory mode in which both of the external memory 105 and the document 19 are used.

In addition, when the external memory 105 is connected to the connecting unit 106, and the document 19 is not set on the paper setting portion 21 or the reading surface 11*a*, there is a high possibility that only the external memory 105 is used. For this reason, the CPU 103 executes the mode switching process, thereby the mode is automatically switched to the direct print mode where the external memory 105 is used.

Further, when the external memory 105 is not connected to the connecting unit 106, and the document 19 is set on the paper setting portion 21 or the reading surface 11*a*, there is a high possibility that only the document 19 is used. For this reason, the CPU 103 executes the mode switching process, thereby the mode is automatically switched to the user-defined mode where the document 19 is used.

Furthermore, when the external memory 105 is not connected to the connecting unit 106, and the document 19 is not set on the paper setting portion 21 or the reading surface 11*a*, the CPU 103 executes the mode switching process, thereby the operating mode is automatically switched to the default mode.

Advantageous Effect of the First Embodiment

As explained above, the multifunction device 1 of the first embodiment is formed to predict the mode the user desires by checking the connection of the external memory 105 to the connecting unit 106 and the setting of the document 19 on the paper setting portion 21 or the reading surface 11*a*. Thereby, the multifunction device 1 of the first embodiment automatically switches the operating environment provided by the operating unit 14 to the operating environment corresponding to the predicted mode. Therefore, according to the multifunction device 1, a user operation of switching the mode can be omitted, and the usability can be improved.

In particular, the user-defined mode and the default mode of the multifunction device 1 can be set by the user of the multifunction device 1. For this reason, the mode can be switched to the mode which is most likely be carried out next.

When the document is not set on the multifunction device 1 and when the external memory 105 is not connected to the multifunction device 1, the multifunction device 1 of the present invention, automatically switches to the operating environment which corresponds to the preset default mode.

Accordingly, the multifunction device 1 can smoothly proceed to the next operation.

Second Embodiment

Next, a second embodiment will be described. A multifunction device described in the second embodiment is different from the multifunction device 1 of the first embodiment only for the default mode process. For this reason, a description of configurations and processes same as those of the multifunction device 1 of the first embodiment is omitted by putting identical numerical numbers. A description will be provided mainly for the default mode process which is different from that of the first embodiment.

In the second embodiment, the print mode is set as the default mode, and the copy mode is set as the user-defined mode.

Figure 12:
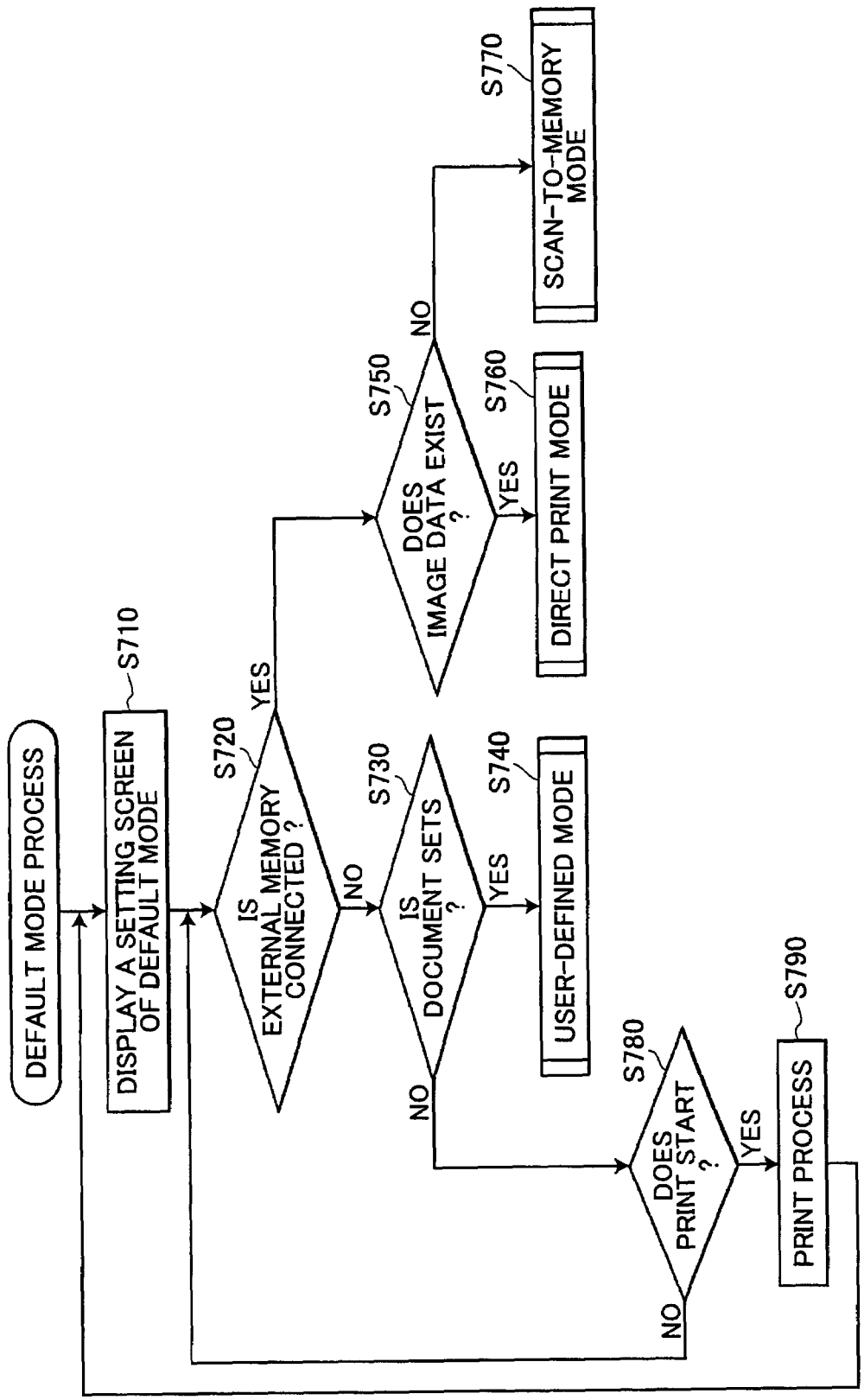
FIG. 12 is a flowchart showing a default mode process of a second embodiment.

FIG. 12 is a flowchart showing the default mode process in the second embodiment.

At first, in S710 of the default mode process, the CPU 103 allows the display driving unit 91 to display, on the display unit 15, a setting screen which is switched to the operating environment corresponding to the mode set as the default mode (print mode in the present embodiment).

In the next S720, the CPU 103 obtains a detecting result of the connection detecting unit 93 to determine whether the external memory 105 is connected to the connecting unit 106. As a result thereof, if the CPU 103 determines that the external memory 105 is not connected to the connecting unit 106 (S720: NO), the CPU 103 proceeds to S730.

In S730, the CPU 103 obtains a light receiving signal from the setting unit detecting sensor 24 and the reading surface detecting sensor 35. Thereby, the CPU 103 determines whether the document 19 is set on at least one of the paper setting portion 21 and the reading surface 11a. As a result thereof, if the CPU 103 determines that the document 19 is set on one or both of the paper setting portion 21 and the reading surface 11a (S730: YES), the CPU 103 proceeds to S740.

In S740, the mode is switched to the user-defined mode process.

If the CPU 103 determines that the external memory 105 is connected to the connecting unit 106 (S720: YES), the CPU 103 proceeds to S750.

In S750, the CPU 103 determines whether any image data is stored in the external memory 105 connected to the connecting unit 106. More specifically, the CPU 103 analyzes identifiers, for example extensions, showing data attributes or the content of data for all pieces of data stored in the external memory 105. Thereby, the CPU 103 determines whether there is at least one piece of printable image data stored in the external memory 105.

Then, if the CPU 103 determines that there is printable image data stored in the external memory 105 (S750: YES), the CPU 103 proceeds to S760. In S760, the CPU 103 switches to the direct print mode process.

On the other hand, if the CPU 103 determines that there is no printable image data stored in the external memory 105 (S750: NO), the CPU 103 proceeds to S770. In S770, the CPU 103 switches operating mode to the scan-to-memory mode process.

If the CPU 103 determines that the document 19 is not set on either the paper setting portion 21 or the reading surface 11a (S730: NO), the CPU 103 proceeds to S780.

In S780, the CPU 103 determines whether to execute the print mode. As a result thereof, if the CPU 103 determines to execute the print mode, the CPU 103 proceeds to S790. That is, the CPU 103 determines whether any of the image data stored in the multifunction device 1 is designated and information of the number of prints is input, which are required for executing the print mode, and whether the start key 14b is pressed. As a result of the determination, if the image data stored in the multifunction device 1 is designated, the information of the number of prints is input, and the start key 14b is pressed, the CPU 103 proceeds to S790.

In S790, the print mode is executed, and image data stored in the multifunction device 1 is printed in accordance with the designated image data and the number of prints being input. Then, the CPU 103 returns to S710.

If the CPU 103 determines not to execute the print mode (S780: NO), the CPU 103 returns to S720. That is, if the user of the multifunction device 1 does not execute at least one of the designation of the image data stored in the multifunction device 1, the input of the information of the number of prints, and the pressing of the start key 14b, the CPU 103 returns to S720.

Advantageous Effect of the Second Embodiment

As described above, in the multifunction device of the second embodiment, when the external memory 105 is connected in the default mode process and no image data is stored in the external memory 105, the operating mode is automatically switched to the scan-to-memory mode since there is a high possibility that a document is set on the paper setting portion 21 or the reading surface 11a and the scan-to-memory mode is executed. Therefore, according to the multifunction device of the second embodiment, the possibility of switching the operating mode which the user desires can be made higher as compared with the multifunction device of the first embodiment. As a result, the usability of the multifunction device can be improved.

Third Embodiment

Next, a third embodiment will be described. A multifunction device described in the third embodiment is different from the multifunction device 1 of the first embodiment only for the operation automatically carried out by executing the mode switching process. For this reason, a description of configurations and processes similar to those of the multifunction device 1 of the first embodiment is omitted by putting identical numerical numbers. A description will be provided mainly on the processes that are different from those of the first embodiment. In the third embodiment, the print mode is set as the default mode, and the copy mode is set as the user-defined mode.

<Default Mode Process>

Figure 13:
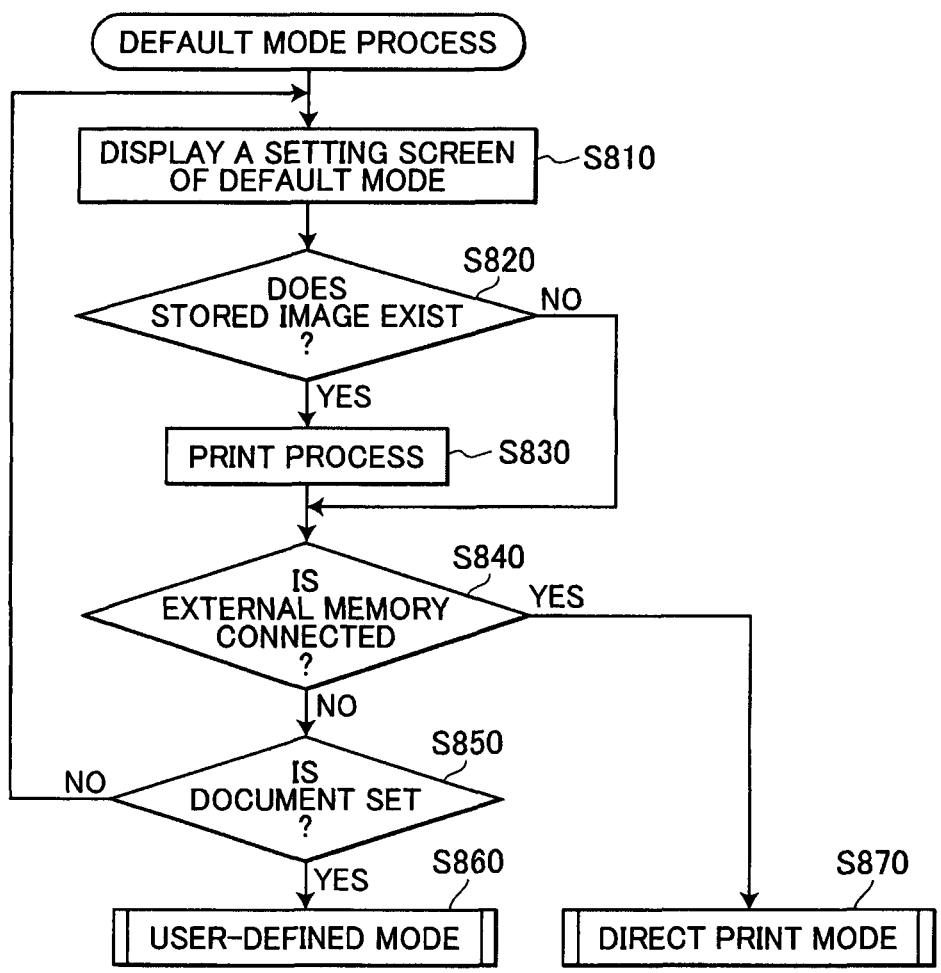
FIG. 13 is a flowchart showing a default mode process of a third embodiment.

FIG. 13 is a flowchart showing a default mode process. At first, in S810 of the default mode process, the CPU 103 allows the display driving unit 91 to display, on the display unit 15, a screen which is switched to the operating environment corresponding to the default mode (print screen in the present embodiment).

In S820, the CPU 103 determines whether image data is stored in the NVRAM 107 of the multifunction device 1. As a result thereof, if the CPU 103 determines that image data is stored (S820: YES), the CPU 103 proceeds to S830. If the CPU 103 determines that no image data is stored (S820: NO), the CPU 103 proceeds to S840.

In S830, the print mode is executed, and the image data stored in the multifunction device 1 is printed. Then, the CPU 103 proceeds to S840.

In the next S840, the CPU 103 obtains a detecting result of the connection detecting unit 93 to determine whether the external memory 105 is connected to the connecting unit 106. As a result thereof, if the CPU 103 determines that the external memory 105 is connected to the connecting unit 106, the CPU 103 proceeds to S870.

In S870, the operating mode is switched to the direct print mode process.

If the CPU 103 determines that the external memory 105 is not connected (S840: NO), the CPU 103 proceeds to S850.

In S850, the CPU 103 obtains a light receiving signal from the setting unit detecting sensor 24 and the reading surface detecting sensor 35. Thereby, the CPU 103 determines whether the document 19 is set on at least one of the paper setting portion 21 and the reading surface 11a. As a result thereof, if the CPU 103 determines that the document 19 is set on one or both of the paper setting portion 21 and the reading surface 11a, the CPU 103 proceeds to S860.

In S860, the CPU switches the operating mode to the user-defined mode process.

If the CPU 103 determines that the document 19 is not set on either the paper setting portion 21 or the reading surface 11a (S850: YES), the CPU 103 returns to S810.

<Direct Print Mode Process>

Figure 14:
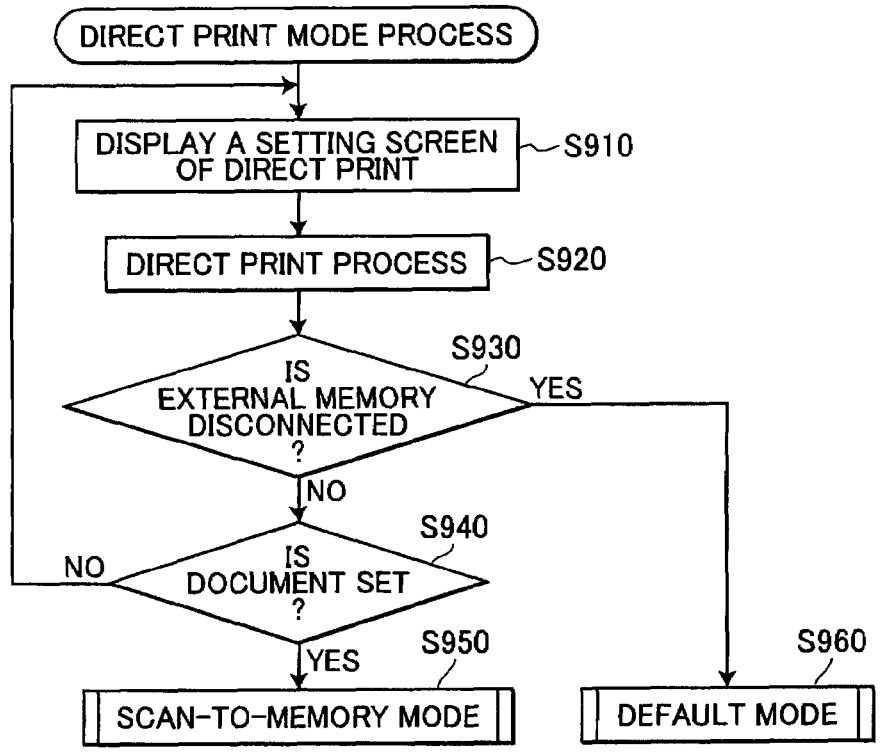
FIG. 14 is a flowchart showing a direct print mode process of the third embodiment.

FIG. 14 is a flowchart showing a direct print mode process. In S910 of the direct print mode process, the CPU 103 allows the display driving unit 91 to display, on a display unit 15, a screen which is switched to the operating environment corresponding to the direct print mode.

In the next S920, the direct print mode is executed, image data is read from the external memory 105, and the read image data is printed on the paper 18. Then, the CPU 103 proceeds to S930.

In S930, the CPU 103 obtains a detecting result of the connection detecting unit 93 to determine whether the external memory 105 is disconnected to the connecting unit 106. As a result thereof, if the CPU 103 determines that the external memory 105 is disconnected to the connecting unit 106 (S930: YES), the CPU 103 proceeds to S960. In S960, the operating mode is switched to the default mode process.

On the other hand, if the CPU 103 determines that the external memory 105 is not disconnected (S930: NO), the CPU 103 proceeds to S940.

In S940, the CPU 103 obtains a light receiving signal from the setting unit detecting sensor 24 and the reading surface detecting sensor 35. Thereby, the CPU 103 determines whether the document 19 is set on at least one of the paper setting portion 21 and the reading surface 11a. As a result thereof, if the CPU 103 determines that the document 19 is set on one or both of the paper setting portion 21 and the reading surface 11a (S940: YES), the CPU 103 proceeds to S950.

In S950, the CPU 103 switches to the scan-to-memory mode process.

As a result of the determination in S940, if the CPU 103 determines that the document 19 is not set on either the paper setting portion 21 or the reading surface 11a, the CPU 103 returns to S910.

<Scan-To-Memory Mode Process>

Figure 15:
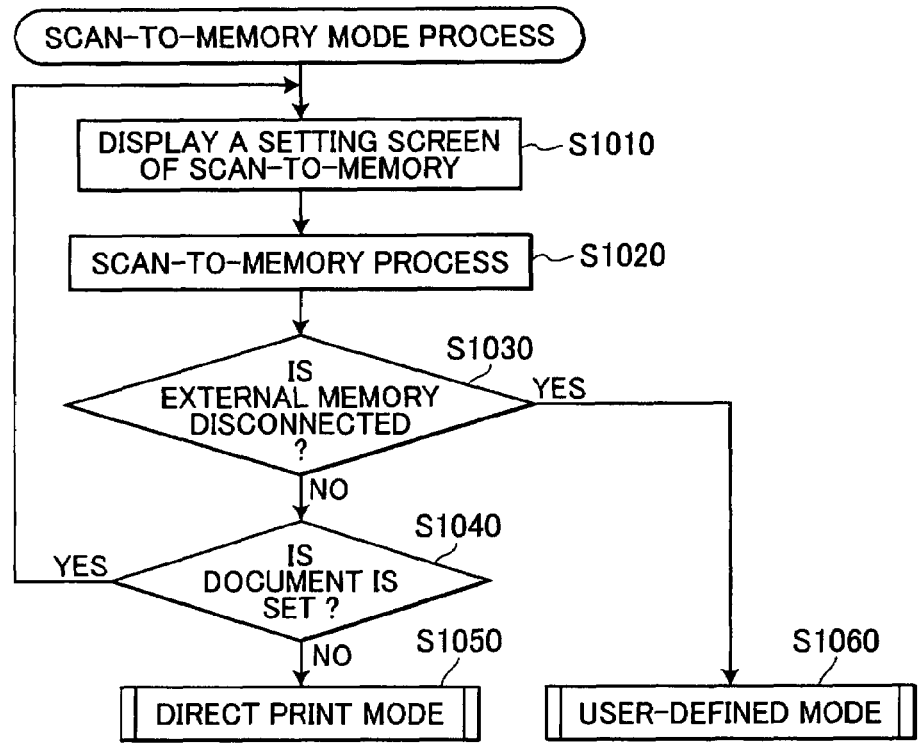
FIG. 15 is a flowchart showing a scan-to-memory mode process of the third embodiment.

FIG. 15 is a flowchart showing a scan-to-memory mode process. In S1010 of the scan-to-memory mode, the CPU 103 allows the display driving unit 91 to display, on a display unit 15, a screen which is switched to the operating environment corresponding to the scan-to-memory mode.

In the next S1020, the scan-to-memory mode is executed, and the image read from the document 19 is stored in the external memory 105 as image data. Then, the CPU 103 proceeds to S1030.

In S1030, the CPU 103 obtains a detecting result of the connection detecting unit 93 to determine whether the external memory 105 is disconnected to the connecting unit 106. As a result thereof, if the CPU 103 determines that the external memory 105 is disconnected to the connecting unit 106 (S1030: YES), the CPU 103 proceeds to S1060. In S1060, the CPU 103 switches to the user-defined mode process.

On the other hand, if the CPU 103 determines that the external memory 105 is not disconnected (S1030: NO), the CPU 103 proceeds to S1040.

In S1040, the CPU 103 obtains a light receiving signal from the setting unit detecting sensor 24 and the reading surface detecting sensor 35. Thereby, the CPU 103 determines whether the document 19 is set on at least one of the paper setting portion 21 and the reading surface 11a. As a result thereof, if the CPU 103 determines that the document 19 is not set on either the paper setting portion 21 or the reading surface 11a, the CPU 103 proceeds to S1050.

In S1050, the operating mode is switched to the direct print mode process.

If the CPU 103 determines that the document 19 is set on one or both of the paper setting portion 21 and the reading surface 11a (S1040: YES), the CPU 103 returns to S1010.

<User-Defined Mode Process>

Figure 16:
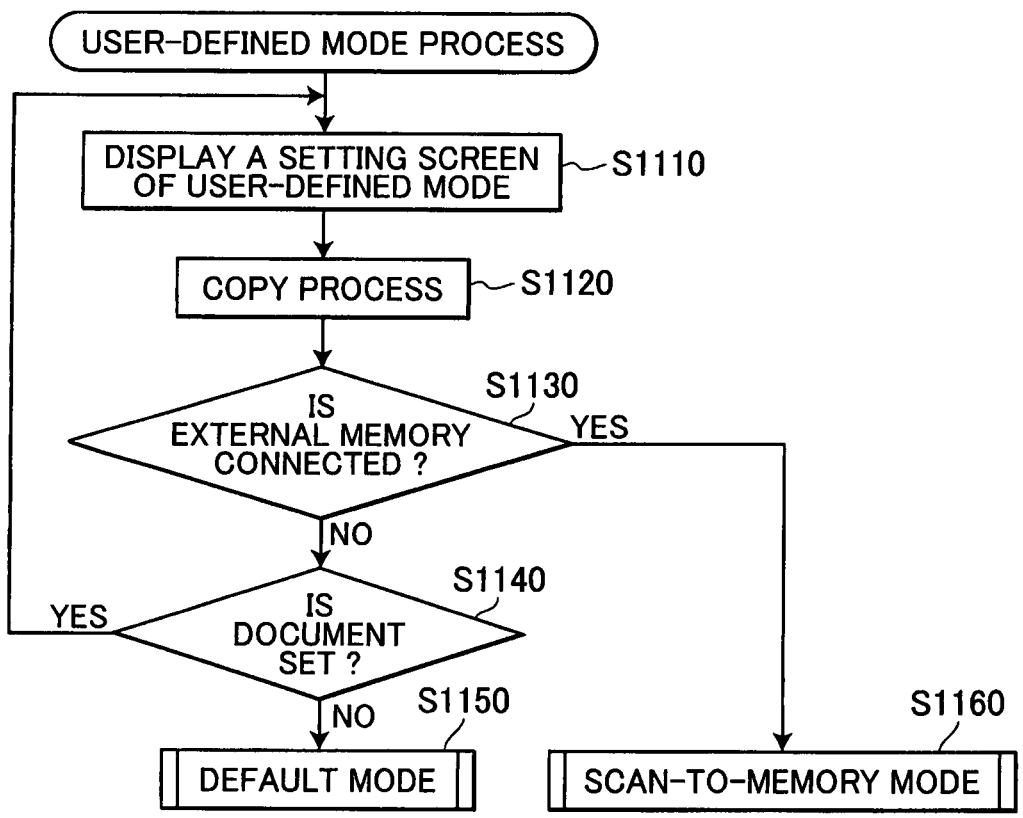
FIG. 16 is a flowchart showing a user-defined mode process of the third embodiment.

FIG. 16 is a flowchart showing a user-defined mode process of the third embodiment. In S1110 of the user-defined mode, the CPU 103 allows the display driving unit 91 to display, on the display unit 15, a screen (copy screen in the present embodiment) which is switched to the operating environment corresponding to the user-defined mode.

In the next S1120, the copy mode is executed, and an image read from the document 19 is printed on the paper 18. Then, the CPU 103 proceeds to S1130.

In S1130, the CPU 103 obtains a detecting result of the connection detecting unit 93 to determine whether the external memory 105 is connected to the connecting unit 106. As a result thereof, if the CPU 103 determines that the external memory 105 is connected to the connecting unit 106 (S1130: YES), the CPU 103 proceeds to S1160. In S1160, the mode is switched to the scan-to-memory mode process.

If the CPU 103 determines that the external memory 105 is not connected (S1130: NO), the CPU 103 proceeds to S1140.

In S1140, the CPU 103 obtains a light receiving signal from the setting unit detecting sensor 24 and the reading surface detecting sensor 35. Thereby, the CPU 103 determines whether the document 19 is set on at least one of the paper setting portion 21 and the reading surface 11a. As a result thereof, if the CPU 103 determines that the document 19 is not set on either the paper setting portion 21 or the reading surface 11a, the CPU 103 proceeds to S1150.

In S1150, the CPU 103 switches to the default mode process.

If the CPU 103 determines that the document 19 is set on one or both of the paper setting portion 21 and the reading surface 11a (S1140: YES), the CPU 103 returns to S1110.

Advantageous Effect of the Third Embodiment

As described above, the multifunction device of the third embodiment automatically switches to the operating mode that the user desires by the operating mode switching process, and automatically executes the process in the switched mode. Therefore, according to the multifunction device of the third embodiment, the process of the operating mode that the user desires can be executed without the user switching the mode and carrying out the operation of starting the process of the selected operating mode. As a result, the usability of the multifunction device can be improved.

Other Embodiments

While the invention has been described in detail with reference to the above aspects thereof, it would be apparent to those skilled in the art that various changes and modifications may be made therein without departing from the spirit of the invention.

For example, the default mode in the multifunction device 1, described above, is set by selecting one mode from a plurality of types of the operating modes by operating the operating unit 14. However, the present invention is not limited thereto. That is, the number of times that each operating mode is used in the multifunction device 1 is counted, and the operating mode that is most frequently used may be set as the default mode. Further, the default mode in the multifunction device 1 is not limited to the one set by the user, and may be set at the manufacturing process of the multifunction device 1.

In addition, the user-defined mode in the multifunction device 1 is set by the user of the multifunction device 1 by selecting the operating mode he or she desires by operating the operating unit 14. However, the present invention is not limited thereto. For example, the user may set the user-defined mode as the operating mode which is most frequently used among the operating modes including the process of reading image data from the document 19.

The default mode and the user-defined mode in the multifunction device 1 may be the same mode.

In addition, the multifunction device of the second embodiment determines whether any printable image data is stored in the external memory 105 based on the extension of the data stored in the external memory 105. However, the present invention is not limited thereto. For example, the multifunction device of the second embodiment may determine whether any printable image data is stored in the external memory 105 based on the header of the data stored in the external memory 105, or based on other methods.

The external memory 105 may be any memory so long as such memory can store image data. That is, a general hard disk or a memory medium that can be connected by USB including Smart Media (registered trademarks) and Compact Flash (registered trademarks) can be used as the external memory 105.

What is claimed is:

1. A multifunction device having a reading mode that executes a reading process that reads image information by using a first type medium by scanning an original document and a writing mode that executes a writing process that prints an image on a recording sheet by using a second type medium, the multifunction device comprising:
    a detecting unit configured to detect either the first type medium or the second type medium used; and
    a controlling unit that sets one of the reading mode and the writing mode as a target mode based on a detected result of the detecting unit,
    wherein the controlling unit automatically executes one of the reading process and the writing process corresponding to the target mode, as an execution target,
    wherein when a process of the execution target is completed and when the detecting unit detects another detected result that is different from the detected result, the controlling unit automatically changes the target mode to a new target mode that is one of the reading mode and the writing mode and is different from the target mode, changes the execution target into a new execution target corresponding to the new target mode, and automatically executes the new execution target that is one of the reading process and the writing process.

2. The multifunction device as claimed in claim 1, the multifunction device further having a non-detected-medium-mode configured to execute a preset operation,
    wherein the controlling unit automatically executes the preset operation of the non-detected-medium-mode when the detecting unit detects that both of the first type medium and the second type medium are absent.

3. The multifunction device as claimed in claim 1, further having a printing mode that executes a printing process that prints an image information on a printing medium,
    wherein the controlling unit automatically executes at least one of the reading process, the writing process, and the printing process based on a detecting result of the detecting unit.

4. The multifunction device as claimed in claim 1, wherein the first type medium is a document and a second type medium is an external storage device, the multifunction device further comprising:
    a setting unit on which a document is set; and
    a mounting unit to which an external storage device is mounted,
    wherein the detecting unit comprises:
        a document detecting unit configured to detect whether a document is set on the setting unit; and
        an external storage device detecting unit configured to detect whether an external storage device is mounted to the mounting unit.

5. The multifunction device as claimed in claim 4, wherein one of the reading mode and the writing mode includes a scan-to-memory mode that executes a scan-to-memory process that writes image information read from the document to the external storage device;
    wherein the control unit automatically executes the scan-to-memory process when the document detecting unit detects a document and when the external storage device detecting unit detects an external storage device.

6. The multifunction device as claimed in claim 1, wherein the first type medium is an external storage device, the multifunction device further comprising:
    a mounting unit to which an external storage device is mounted; and
    a setting unit on which a document is set,
    wherein the detecting unit comprises:
        an external storage device detecting unit configured to detect whether an external storage device is mounted to the mounting unit; and
        a document detecting unit configured to detect whether a document is set on the setting unit.

7. The multifunction device as claimed in claim 6, wherein the reading mode includes a direct print mode which executes a direct print process that prints image information read from the external storage device to a printing medium;
    wherein the controlling unit automatically executes the direct print process, when the document detecting unit detects absence of a document and when the external storage device detecting unit detects an external storage device.

8. The multifunction device as claimed in claim 4, wherein the reading mode includes a document reading mode which executes a document reading process that reads image information from the document,
    wherein the controlling unit automatically executes the document reading process, when the document detecting unit detects a document and when the external storage device detecting unit detects absence of an external storage device.

9. The multifunction device as claimed in claim 8, further having a plurality of reading modes and further comprising:
a mode setting unit configured to set one of a plurality of reading modes as the document reading mode.

10. The multifunction device as claimed in claim 4, further having a preset mode that executes a previously set operation;
wherein, when the document detecting unit detects absence of a document and the external storage device detecting unit detects absence of an external storage device, the controlling unit automatically executes the previously set operation of the preset mode.

11. The multifunction device as claimed in claim 10, further comprising a mode setting unit configured to set one of the plurality of modes as the preset mode.

12. The multifunction device as claimed in claim 4, wherein the reading mode includes a scan-to-memory mode that executes a scan-to-memory process that writes image information read from the document to the external storage device,
wherein the detecting unit includes a storage detecting unit configured to detect whether image information stored in an external storage device mounted to the mounting unit exists; and
wherein the control unit automatically executes the scan-to-memory process when the storage detecting unit detects absence of image information.

13. A multifunction device having a reading mode that executes a reading process that reads image information by scanning an original document and a writing mode that executes a writing process that prints an image on a recording sheet, the multifunction device comprising:
a mounting unit that detachably mounts an external storage device;
an external storage device detecting unit configured to detect whether the external storage device is mounted to the mounting unit; and
a controlling unit that sets one of the reading mode and the writing mode as a target mode based on a detected result of the external storage device detecting unit,
wherein the controlling unit automatically executes one of the reading process and the writing process corresponding to the target mode, as an execution target,
wherein when a process of the execution target is completed and when the external storage device detecting unit detects another detected result that is different from the detected result, the controlling unit automatically changes the target mode to a new target mode that is one of the reading mode and the writing mode and is different from the target mode, changes the execution target into a new execution target corresponding to the new target mode, and automatically executes the new execution target that is one of the reading process and the writing process.

14. A multifunction device having a reading mode that executes a reading process that reads image information by scanning an original document and a writing mode that executes a writing process that prints an image on a recording sheet, the multifunction device comprising:
a placing unit configured to place a document;
a document detecting unit configured to detect whether the document placed on the placing unit exists; and
a controlling unit that sets one of the reading mode and the writing mode as a target mode based on a detected result of the detecting unit,
wherein the controlling unit automatically executes one of the reading process and the writing process corresponding to the target mode, as an execution target,
wherein when a process of the execution target is completed and when the document detecting unit detects another detected result that is different from the detected result, the controlling unit automatically changes the target mode to a new target mode that is one of the reading mode and the writing mode and is different from the target mode, changes the execution target into a new execution target corresponding to the new target mode, and automatically executes the new execution target that is one of the reading process and the writing process.

15. A multifunction device having a reading mode that executes a reading process that reads image information using a first type medium by scanning an original document and a writing mode that executes a writing process that prints an image on a recording sheet using a second type medium, the multifunction device comprising:
a detecting unit configured to detect at least one of the first type medium and the second type medium and absence of at least one of the first type medium and the second type medium; and
a controlling unit that sets one of the reading mode and the writing mode as a target mode based on a detected result of the detecting unit,
wherein the controlling unit automatically executes one of the reading process and the writing process corresponding to the target mode, as an execution target,
wherein when a process of the execution target is completed and when the detecting unit detects another detected result that is different from the detected result, the controlling unit automatically changes the target mode to a new target mode that is one of the reading mode and the writing mode and is different from the target mode, changes the execution target into a new execution target corresponding to the new target mode, and automatically executes the new execution target that is one of the reading process and the writing process.

16. The multifunction device as claimed in claim 15, wherein when the detecting unit detects one of the first type medium and the second type medium, the controlling unit automatically executes a detected-medium mode that executes a detected-medium process which uses the detected one of the first type medium and the second type medium when the detecting unit detects the medium.

17. The multifunction device as claimed in claim 15, the multifunction device further having a non-detected-medium mode configured to execute a preset operation, wherein the controlling unit automatically executes the preset operation of the non-detected-medium-mode when the detecting unit detects that both of the first type medium and the second type medium are absent.

18. The multifunction device as claimed in claim 16, further having a plurality of detected-medium modes, each of the plurality of detected medium modes configured to execute an operation using the detected medium, wherein the controlling unit automatically executes the operation using the detected medium corresponding to one of the plurality of the detected medium modes that is previously set by the user.

19. The multifunction device as claimed in claim 15, wherein the first type medium is a document and a second type medium is an external storage device,
the multifunction device further comprising:
a setting unit on which a document is set; and
a mounting unit to which an external storage device is mounted, wherein the detecting unit comprises:
- a document detecting unit configured to detect whether a document is set on the setting unit; and
- an external storage device detecting unit configured to detect whether an external storage device is mounted to the mounting unit.

20. The multifunction device as claimed in claim 19, further comprising a scan-to-memory mode configured to execute a scan-to-memory process that writes image information read from the document to the external storage device,
   wherein the controlling unit automatically executes the scan-to-memory process, when the document detecting unit detects a document and when the external storage device detecting unit detects an external storage device.

21. The multifunction device as claimed in claim 19, further comprising a direct print mode configured to execute a direct print process that prints image information read from the external storage device to a printing medium,
   wherein the controlling unit automatically executes the direct print process, when the document detecting unit detects absence of a document and when the external storage device detecting unit detects an external storage device.

22. The multifunction device as claimed in claim 19, further comprising a document reading mode which executes a document reading process that reads image information from the document,
   wherein the controlling unit automatically executes the document reading process, when the document detecting unit detects a document and when the external storage device detecting unit detects absence of an external storage device.

23. The multifunction device as claimed in claim 22, further comprising:
   a mode setting unit configured to set one of a plurality of modes that reads image information from a document as the document reading mode.

24. The multifunction device as claimed in claim 19, further comprising a preset mode that executes a previously set operation,
   wherein the controlling unit automatically executes the previously set operation of the preset mode, when the document detecting unit detects absence of a document and the external storage device detecting unit detects absence of an external storage device.

25. The multifunction device as claimed in claim 24, further comprising a mode setting unit configured to set one of a plurality of modes as the preset mode.

26. The multifunction device as claimed in claim 19, further comprising a scan-to-memory mode which executes a scan-to-memory process that writes image information read from a document to an external storage device,
   wherein the detecting unit includes a storage detecting unit configured to detect whether image information stored in an external storage device mounted to the mounting unit exists, and
   wherein the controlling unit automatically executes the scan-to-memory process, when the storage detecting unit detects absence of image information.

27. A multifunction device having a reading mode that executes a reading process that reads image information by scanning an original document and a writing mode that executes a writing process that prints an image on a recording sheet, the multifunction device comprising:
   an external storage device detecting unit configured to detect whether an external storage device is mounted to a mounting unit; and
   a controlling unit that sets one of the reading mode and the writing mode as a target mode based on a detected result of the external storage device detecting unit,
   wherein the controlling unit automatically executes one of the reading process and the writing process corresponding to the target mode, as an execution target,
   wherein when a process of the execution target is completed and when the external storage device detecting unit detects another detected result that is different from the detected result, the controlling unit automatically changes the target mode to a new target mode that is one of the reading mode and the writing mode and is different from the target mode, changes the execution target into a new execution target corresponding to the new target mode, and automatically executes the new execution target that is one of the reading process and the writing process.

28. A multifunction device having a reading mode that executes a reading process that reads image information by scanning an original document and a writing mode that prints an image on a recording sheet, the multifunction device comprising:
   a document detecting unit configured to detect whether a document placed on a placing unit exists; and
   a controlling unit that sets one of the reading mode and the writing mode as a target mode based on a detected result of the document detecting unit,
   wherein the controlling unit automatically executes one of the reading process and the writing process corresponding to the target mode, as an execution target,
   wherein when a process of the execution target is completed and when the document detecting unit detects another detected result that is different from the detected result, the controlling unit automatically changes the target mode to a new target mode that is one of the reading mode and the writing mode and is different from the target mode, changes the execution target into a new execution target corresponding to the new target mode, and automatically executes the new execution target that is one of the reading process and the writing process.

* * * * *